(12) United States Patent
Ganu et al.

(10) Patent No.: US 9,060,279 B2
(45) Date of Patent: Jun. 16, 2015

(54) SYSTEM AND METHOD FOR COMPUTING COVERAGE SET AND RESOURCE ALLOCATIONS IN WIRELESS NETWORKS

(75) Inventors: Sachin Ganu, San Jose, CA (US); Gautam Dilip Bhanage, Sunnyvale, CA (US); Partha Narasimhan, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 322 days.

(21) Appl. No.: 13/563,610

(22) Filed: Jul. 31, 2012

(65) Prior Publication Data

US 2014/0036788 A1    Feb. 6, 2014

Related U.S. Application Data

(63) Continuation of application No. 13/563,500, filed on Jul. 31, 2012.

(51) Int. Cl.
| | |
|---|---|
| *H04W 16/10* | (2009.01) |
| *H04W 40/00* | (2009.01) |
| *H04W 52/36* | (2009.01) |
| H04W 52/50 | (2009.01) |

(52) U.S. Cl.
CPC ............ *H04W 16/10* (2013.01); *H04W 40/00* (2013.01); *H04W 52/367* (2013.01); *H04W 52/50* (2013.01)

(58) Field of Classification Search
USPC ................................................. 370/328, 329
See application file for complete search history.

(56) References Cited

U.S. PATENT DOCUMENTS

| | | | | |
|---|---|---|---|---|
| 6,192,244 B1* | 2/2001 | Abbadessa | ................... | 455/436 |
| 7,315,533 B2* | 1/2008 | Theobold et al. | ............. | 370/338 |
| 2005/0003827 A1 | 1/2005 | Whelan | | |
| 2006/0253570 A1* | 11/2006 | Biswas et al. | ................. | 709/224 |
| 2006/0281412 A1* | 12/2006 | Skafidas et al. | .............. | 455/63.1 |
| 2008/0090575 A1 | 4/2008 | Barak et al. | | |
| 2008/0117849 A1* | 5/2008 | Borran et al. | ................. | 370/311 |
| 2009/0247206 A1 | 10/2009 | Yacono | | |
| 2011/0085532 A1 | 4/2011 | Scherzer et al. | | |
| 2011/0122788 A1* | 5/2011 | Sombrutzki et al. | .......... | 370/252 |
| 2012/0134290 A1 | 5/2012 | Douglas et al. | | |
| 2012/0178462 A1* | 7/2012 | Kim | .............................. | 455/450 |
| 2012/0324124 A1* | 12/2012 | Locker et al. | ................. | 709/233 |

* cited by examiner

*Primary Examiner* — Andrew Lai
*Assistant Examiner* — Sumitra Ganguly
(74) *Attorney, Agent, or Firm* — Ying Wang

(57) ABSTRACT

The present disclosure discloses a network device and/or method for computing coverage set and resource allocations in wireless networks. The disclosed network device receives a radio frequency subdomain and a coverage set for the radio frequency subdomain in a wireless network. Furthermore, the disclosed network device selects a capacity mode or a coverage mode as an operating mode of the radio frequency subdomain in response to a measure of network activity satisfying a predetermined condition. In addition, the disclosed network device performs radio resource management in the radio frequency subdomain based on the selected operating mode.

26 Claims, 14 Drawing Sheets

|          | AP 410 | AP 420 | AP 430 | AP 440 | AP 450 |
|----------|--------|--------|--------|--------|--------|
| AP 410   | 0      | 96     | 81     | 68     | 84     |
| AP 420   | 97     | 0      | 100    | 36     | 79     |
| AP 430   | 95     | 98     | 0      | 27     | 79     |
| AP 440   | 69     | 32     | 26     | 0      | 22     |
| AP 450   | 84     | 78     | 81     | 23     | 0      |

SYSTEM AND METHOD FOR COMPUTING COVERAGE SET AND RESOURCE ALLOCATIONS IN WIRELESS NETWORKS

CROSS REFERENCE TO RELATED APPLICATIONS

This application is a continuation of U.S. patent application Ser. No. 13/563,500 filed Jul. 31, 2012. The entire contents of this application are incorporated herewith by reference.

FIELD

The present disclosure relates to resource mapping and management for wireless devices. In particular, the present disclosure relates to computing coverage set and resource allocation in wireless networks.

BACKGROUND

Wireless digital networks, such as networks operating under the current Institute of Electrical and Electronics Engineers (IEEE) 802.11 standards, are spreading in their popularity and availability. However, resource allocation and management has become increasingly important to achieve energy efficiency, improve network capacity, and provide multi-level function and priority support.

An effective resource allocation management of wireless network resources has many advantages. First, effective resource allocation management can facilitate energy savings. Specifically, with adequate information provided, a control-plane mechanism may determine the least number of network devices in the wireless network to turn on without losing connectivity by any wireless client devices.

Second, effective resource allocation management can also improve utilization of wireless network capacity. Specifically, the control-plane mechanism may facilitate spatial utilization of wireless communication bands, for example, by reducing interference in the horizontal plane and maximizing frequency utilization in the vertical plane.

Third, effective resource allocation management further improves management of multi-functional network devices. Today, many network devices on the markets are capable of serving multiple network functionalities based on configurations. For example, an access point device may be configured to act as a network access provider under some circumstances, and to act as a spectrum monitor under other circumstances. Information provided by the resource allocation and management system can help the control-plane mechanism to determine how to configure functions of the network devices in a wireless network.

In addition, effective resource allocation management can also improve priority management of multiple network devices. It allows multiple network devices of the same or similar type to be organized in a hierarchical manner. Thus, some network devices will be given higher priority in the wireless network than other network devices of the same or similar type, and be placed at a hierarchical level that corresponds to a higher priority.

Various conventional resource allocation methods exist in wireless networks. A typical resource allocation method assigns, for each wireless client device, an access point from set A, a channel (pair) from set C, and a transmitter power such that all wireless links between the access point and the wireless client device meet a predetermined Signal-to-Interference Ratio (SIR) requirements.

Existing channel assignment mechanisms, such as Fixed Channel Allocation (FCA) and Dynamic Channel Allocation (DCA), typically are based on simple heuristic rules. For example, FCA provides for fixed reuse and assignment of wireless communication channels by sectorization and directional antennas. FCA partitions the available spectrum into channel sets. The reuse distance constraint is usually satisfied by assigning the channel sets to the cells in each cluster as determined by, e.g., a graphical coloring scheme. On the other hand, with DCA, channels are temporarily assigned for use in cells for the duration of a wireless call session according to the current system conditions and user needs rather than relying on a priori information. Furthermore, transmitter power control schemes can adjust the transmit powers of all wireless users such that the SIR of each user meets a predetermined minimum threshold required for acceptable performance.

Note that, conventional resource allocation methods have many limitations. For example, conventional resource allocation methods do not provide any ways of computing a minimal coverage set that specifies or identifies the minimum number of radios that is required for coverage on a given wireless frequency band. Due to the importance of resource allocation management, it is desirable for an enhanced resource allocation method that is more effective in improving energy efficiency and network capacity, and in providing multi-level function and priority supports for network devices.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
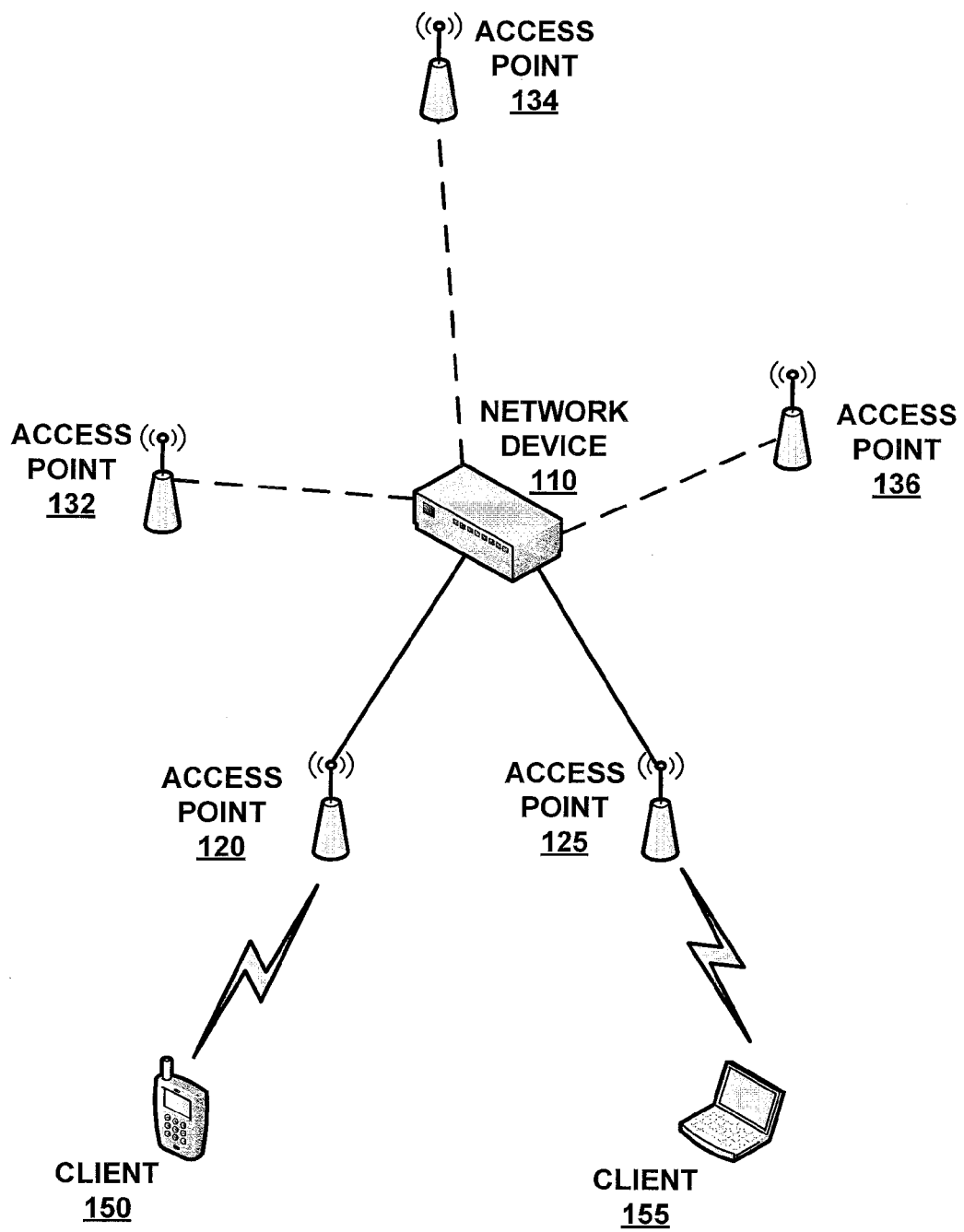
FIG. 1 shows an exemplary wireless network environment according to embodiments of the present disclosure.

In the following description, several specific details are presented to provide a thorough understanding. While the context of the disclosure is directed to resource allocation management in wireless local area network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to resource mapping, allocation, and management for wireless devices in general, and computing coverage set for resource allocation in wireless local area networks (WLAN) in particular. More specifically, techniques for radio resource management in WLAN infrastructure deployments as described in the present disclosure involve partitioning of the wireless networks, calculating the set required for coverage, performing channel and power allocations to all network devices (e.g., access points) in the wireless networks. Furthermore, such resource allocations can be adapted to dynamically handle interference from both valid network devices (e.g. WLAN devices) and non-valid network devices (e.g. non-WLAN devices).

A centralized approach is described herein to address the issue of stability and convergence of power and channel allocations, as well as utilizing system-wide information while performing the power and channel allocations. Therefore, the disclosed techniques in the instant application will mitigate the lack of steady state, which is a problem observed with distributed decision making based on local observations. Furthermore, this approach relies on distributed sensing on the network devices (such as access points), and centrally collects the path loss graph and channel properties from the network devices. Because the path loss graph is relatively invariant, as long as channel properties remain relatively static, for example, where there is no non-WLAN interference, radar detection, or presence of WLAN interference, the allocations will remain reasonably stable.

Computations are done centrally by a control-plane mechanism on a radio frequency master device. The radio frequency master device can be any network devices, such as an access point or a network controller. Moreover, the radio frequency master device receives radio frequency neighbor updates from the network devices (such as access points) in the wireless network. The control-plane mechanism could reside as a process, for example, on a network controller or a server running on the wireless network. The radio frequency master device comes up with an anchor channel for each network device (e.g., access point) in the wireless network. Adjustments to the anchor channel can be made on the network device only on predetermined types of events, such as radar detection, or presence of a non-WLAN interference that degrades the channel quality.

FIG. 1 shows an exemplary wireless network environment according to embodiments of the present disclosure. The wireless network environment illustrated in FIG. 1 includes network device 110 and a plurality of other network devices, such as access point 120, access point 125, access point 132, access point 134, and access point 136. Note that, a control-plane mechanism runs a process on network device 110. The control-plane mechanism is capable of computing coverage sets and resource allocations for wireless networks.

In this example, a number of wireless client devices are connected to the wireless networks through the access points. Specifically, wireless client device 150 is connected to access point 120 through a wireless radio link, and wireless client device 155 is connected to access point 125 through another wireless radio link. According to the present disclosure, the control-plane mechanism on network device 110 will be able to determine a coverage set that includes only access point 120 and access point 125. Thus, network device 110 may instruct other network devices, such as access point 132, access point 134, and access point 136, to power down without causing any loss of connectivity by any wireless network devices (e.g., wireless network device 150 and wireless network device 155) in the wireless network.

In order to accomplish the effective resource allocation management described above, the control-plane mechanism described in the present disclosure performs at least four main operations. The first operation partitions a wireless local area network into radio frequency subdomains; the second operation computes coverage set of network devices required for coverage; the third operation provides channel assignment based on knowledge of path loss and channel characteristics around the network device; and, the fourth operation provides transmit power allocations given the corresponding channel allocations and coverage set calculation.

Radio Frequency Subdomains

Figure 2:
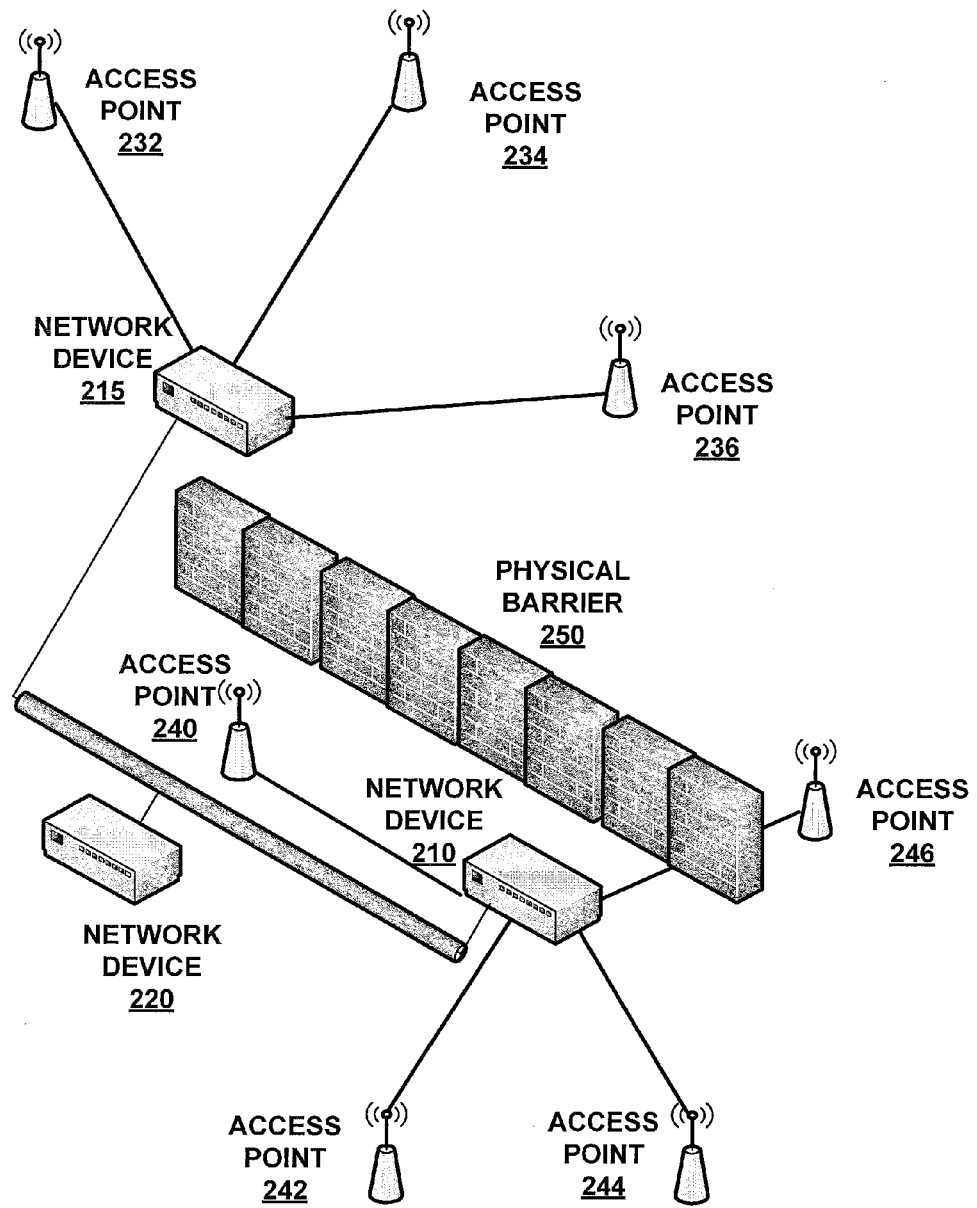
FIG. 2 shows another exemplary wireless network environment according to embodiments of the present disclosure.

FIG. 2 shows another exemplary wireless network environment according to embodiments of the present disclosure. The wireless network environment illustrated in FIG. 2 includes network device 220, which is connected via wired network connections to a number of other network devices, such as network device 210 and network device 215. Network devices, such as network device 210, network device 215, and network device 220 can include a control-plane mechanism for resource allocation and management. Moreover, these network devices may be organized in hierarchical levels. For example, network device 220 may be configured as a master controller that communicates with a number of lower level controllers, such as network device 210 and network device 215.

Furthermore, each network device may be connected to a number of wireless network devices, such as access points, network routers, etc. In this example, network device 210 is connected to access point 240, access point 242, access point 244, and access point 246; and, network device 215 is further connected to access point 232, access point 234, and access point 236. In addition, a physical barrier 250 that is capable of partially or fully blocking wireless signals also exists in the depicted wireless network environment. Because of the existence of physical barrier 250, wireless communications between certain network devices in the wireless network may drop below a desired minimum signal level.

A radio frequency subdomain typically refers to a subset of network devices, any two network devices within which can receive beacon frames from other network devices in the subset at signal level above a predetermined threshold. In order to partition the network devices illustrated in FIG. 2, the control-plane mechanism at the radio frequency (RF) master device first selects an access point terminated on that RF master device. In some embodiments, the access point can be selected randomly. In some embodiments, the access point can be selected according to a configuration or profile provided by a network administrator.

For illustration purposes only, assuming that network device 210 is a RF master device and that network device 210 initially selects access point 240. Next, network device 210 checks the network neighborhood that is within a certain distance of access point 240, e.g., one hop neighborhood of access point 240, and includes all neighbor nodes from which access point 240 maintains a RF distance within a predetermine threshold value. In some embodiments, the RF master device may include all neighbor nodes from which access point 240 can receive wireless signals at a signal strength level above a predetermined threshold value. The RF master device marks the starting access point (i.e., access point 240 in this example) as the root node. Also, for every neighbor node that satisfies the above criteria, the RF master device marks the neighbor node as having been visited.

Furthermore, for each one hop neighbor of access point 240 such as access point 242, the RF master device checks the one hop neighborhood of that one hop neighbor (e.g., access point 242), and includes all neighbor nodes from which access point 242 maintains a RF distance within a predetermine threshold value. In some embodiments, the RF master device may include all neighbor nodes from which access point 242 can receive wireless signals at a signal strength level above a predetermined threshold value. In some embodiments, instead of determining RF neighbors based on RF distances, the RF master device may determine RF neighbors based on pass loss values. Note that, the path loss value may be refined if another neighbor node has a shorter path to the access point (e.g., access point 242). For every neighbor node of access point 242 that satisfies the above criteria, the RF master device marks the neighbor node as having been visited.

Similarly, the RF master device continues the breath-first lookup of its neighbor nodes until all leaf nodes are within the predetermined RF distance from the root node, i.e., access point 240 in this example. Accordingly, all nodes in the constructed tree rooted at the root node (e.g., access point 240) form a distinct RF subdomain.

Next, the RF master device selects another node (e.g., access point 246) that is not marked as having been visited. If all nodes are marked as having been visited, then the RF subdomain partitioning process is complete. Otherwise, the RF master device marks the selected other node (e.g., access point 246) as the root node, and repeats the aforementioned steps to form another distinct RF subdomain. Note that, the RF master device can repeat the root selection and RF subdomain formation process described above until all nodes are marked as having been visited. Therefore, at the end of this process, all access points in this example will be partitioned into one or more RF subdomains based on the path loss graph constructed above.

Figure 3:
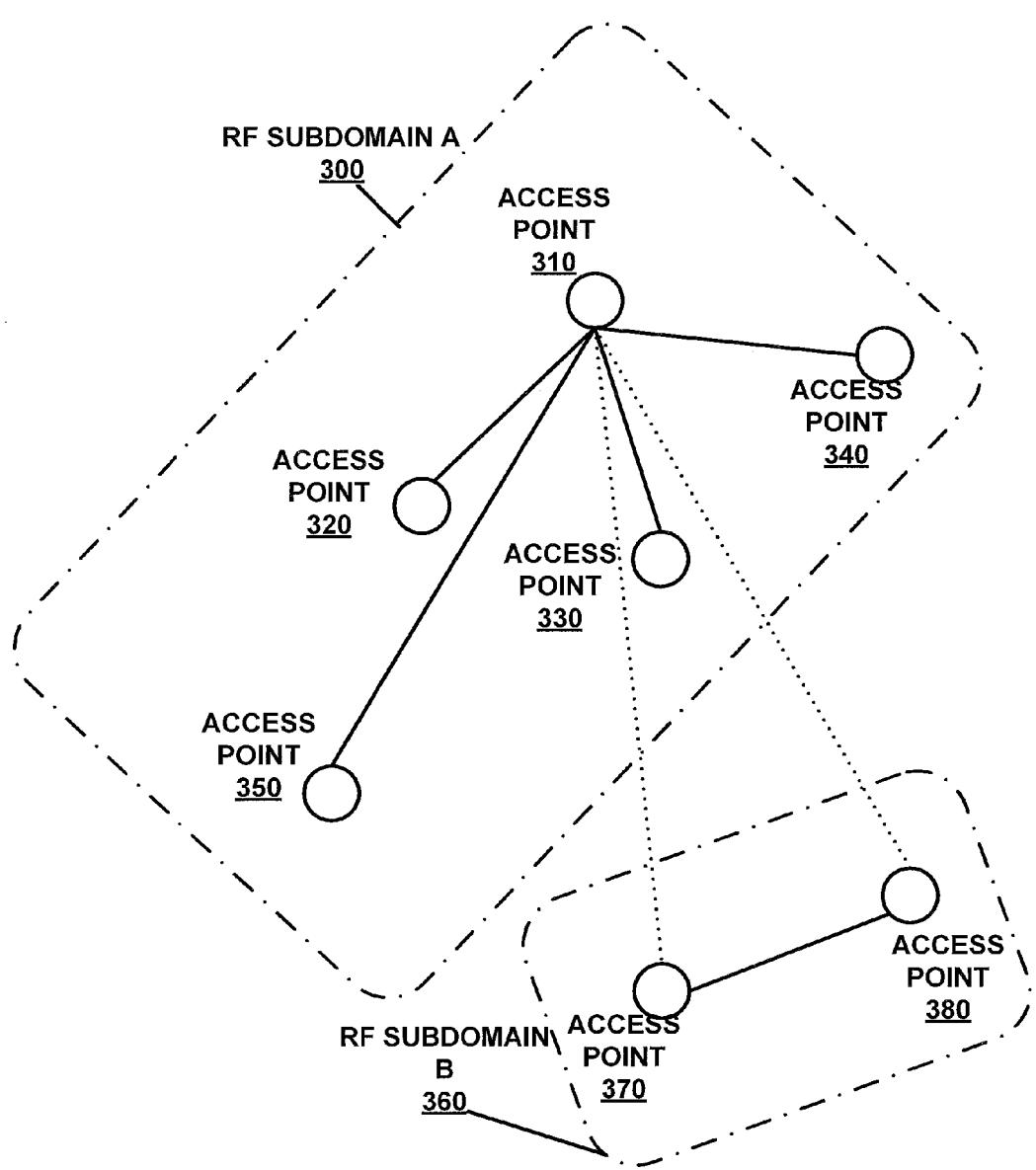
FIG. 3 shows an exemplary diagram illustrating radio frequency subdomain partitioning according to embodiments of the present disclosure.

FIG. 3 shows another example illustrating radio frequency subdomain partitioning. In FIG. 3, seven access points, including access point 310, access point 320, access point 330, access point 340, access point 350, access point 370, and access point 380, are partitioned into two RF subdomains, namely RF subdomain A 300 and RF subdomain B 360. In this example, the RF master device (not shown) begins the process at a randomly selected access point in the network (e.g., access point 310), and perform a breadth-first lookup in its one hop neighborhood to identify all access points that are within a predetermined RF distance to the selected access point, and add those access points to RF subdomain A 300. Thus, in this example, access point 310, access point 320, access point 330, access point 340, and access point 350 are added to RF subdomain A 300. Note that, access point 370 and access point 380 has a larger RF distance (e.g., as measured by path loss values) than the predetermined threshold. Therefore, access point 370 and access point 380 are not included in RF subdomain A 300. Rather, the RF master device selects, e.g., access point 370, as the root node, and repeat the RF subdomain formation process to form RF subdomain B 360. RF subdomain B 360 includes access point 370 and access point 380, where the RF distance between the two nodes is within the predetermined threshold.

Minimal Coverage Sets

A minimal coverage set generally refers to a minimum number of radios on a given band that are typically required to provide wireless coverage for a wireless network. Calculation of the minimal coverage set can be performed based on the following information:

(1) The RF distance or path loss information between different access points in a RF subdomain. Path loss (also referred to as path attenuation) generally refers to the reduction in power density or attenuation of an electromagnetic wave as the electromagnetic wave propagates through an airspace. Path loss may be due to many effects, such as free-space loss, refraction, diffraction, reflection, aperture-medium coupling loss, and absorption. Further, path loss is also influenced by terrain contours, environment (e.g., urban or rural, vegetation and foliage), propagation medium (e.g., dry or moist air), the distance between the transmitter and the receiver, the height and location of radio antennas, etc.

(2) The initial transmit power for every network device (e.g., access points) in the RF subdomain. Increasing transmit power on a wireless communication link has numerous benefits. For example, for any particular set of channel conditions, a higher transmit power typically infers a higher signal power at the receiver. Having a higher signal-to-noise ratio (SNR) at the receiver consequently reduces the bit error rate of the wireless communication link. In addition, a higher SNR can also allow a system that uses link adaptation to transmit at a higher data rate, and thus providing the system with greater spectral efficiency. Moreover, in a wireless fading channel, using higher transmit power provides more protection against a signal fade, and thus reducing probability of dropped calls.

On the other hand, using a higher transmit power, however, has certain drawbacks as well. For example, overall power consumption in the transmitting device can be higher due to a high transmit power, which may result in reduced battery life in mobile client devices correspondingly. Further, interference to other users in the same frequency band is increased. In some wireless networks where users share a single frequency and are only separated by different spreading codes, the number of users that can be supported by the network is typically limited by the amount of interference presented.

Hence, the initial transmit power selection shall aim at striking a balance between the benefits and drawbacks associated with targeting a particular transmit power based on the performance criteria and preference of network administrator.

(3) The available number of orthogonal channels or maximum number of acceptable neighbors for any network device in the RF subdomain. Orthogonal channels generally are formed when a signal is run through a phase-shifter that shifts the phase by 90 degrees, because the original signal and the 90-degree shifted signal are orthogonal to each other. When, for example, orthogonal frequency-division multiplexing (OFDM) is used to encode data on multiple carrier frequencies, the data is divided into several parallel data streams or channels, one for each sub-carrier that is modulated with a conventional modulation scheme, such as, a quadrature amplitude modulation or phase-shift keying at a low symbol rate. Thus, improved utilization of orthogonal channels increases the capacity or the wireless network.

(4) The minimum desired coverage at every network device (such as access point) assuming the network device is the receiver. In some embodiments, the minimum desired coverage may be configured by the network administrator. For example, in a typical enterprise WLAN deployment scenario, it is preferred that three or more access points will detect and report the received signal strength (RSSI) of any wireless client device in the wireless network. Also, the network administrator may configure that the detected signal strength level from the wireless client device shall be −75 dBm or better.

Figures 4A, 4B:
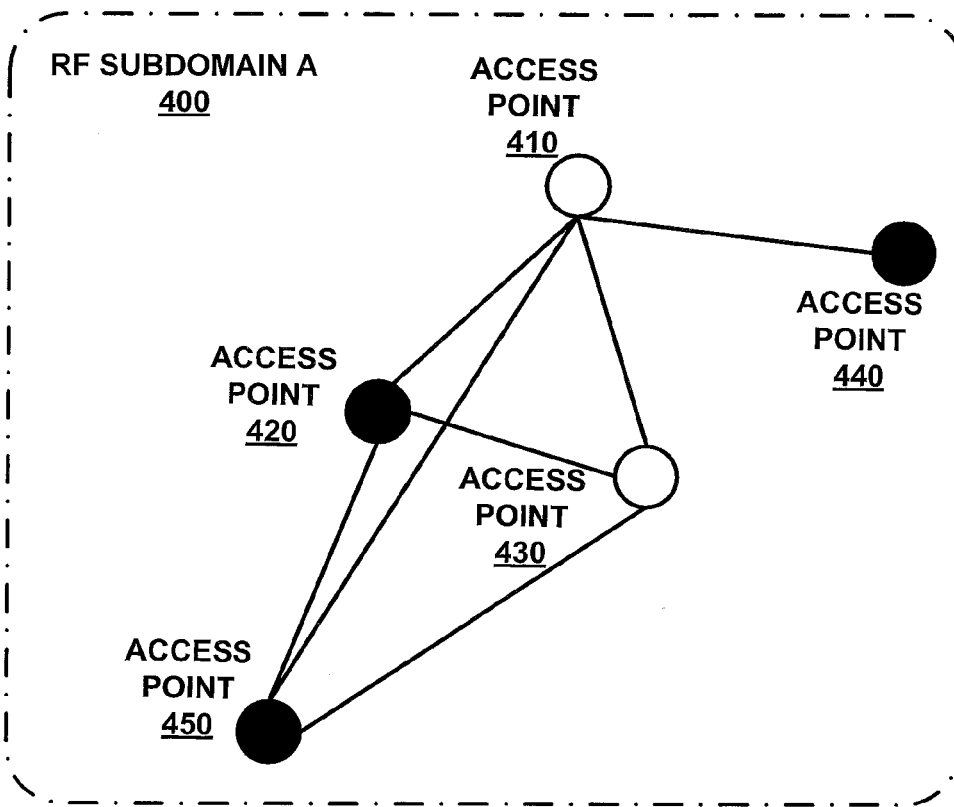
FIG. 4A shows an exemplary diagram illustrating computing coverage set according to embodiments of the present disclosure.
FIG. 4B shows an exemplary table illustrating computing coverage set according to embodiments of the present disclosure.

FIG. 4A and FIG. 4B illustrate an example of coverage set computation. For illustration purposes only, FIG. 4A includes RF subdomain A 400. Furthermore, assuming that there are five access points (e.g., access point 410, access point 420, access point 430, access point 440, and access point 450) in RF subdomain A 400. FIG. 4B includes a table showing the path loss matrix, which includes path loss values between any two access points within RF subdomain A 400.

In some embodiments, the coverage set can be represented by a minimum connected graph corresponding to the selected radio frequency subdomain. In order to compute the coverage set for a RF subdomain, the RF master device perform the following steps:

First, the RF master device computes the maximum transmit power at the access points that will result in a minimal coverage set that can be represented by a minimum connected graph corresponding to the selected radio frequency subdomain. In some embodiments, the RF master device can alternatively computes a minimum transmit power such that the average number of neighbors for every access point to be as close as possible to the number of available channels or desired neighbors.

Second, using the transmit power calculated above, the RF master device determines redundant neighbor nodes of every access point, such that the access point has coverage from at least a predetermined number of neighbor nodes (e.g., X nodes) at a pre-determined signal strength threshold (e.g., 110 dB SNR). Alternatively, overlap can also be determined by checking the beacon reports received from wireless client devices, or virtual beacon reports collected by multiple access points in the network. For example, if two access points both detect a certain number or percentage of common wireless client stations in their vicinity, then the two access points overlap with each other. If such condition is met, the RF master device marks the access point as redundant, and determines the coverage set by excluding the redundant nodes from the set of nodes in the RF domain.

In other words, after a coverage set is identified for a RF subdomain, each node in the RF subdomain is either (a) in the coverage area of another member node, within which the signal strength received from the other node is above a predetermined threshold value (i.e., a redundant node), or (b) covers one or more other nodes with signal strength level beyond the predetermined threshold value (i.e., a member node within the coverage set).

In the example illustrated in FIG. 4A, the RF master device may mark access point 410 and access point 430 as redundant. Therefore, the remaining access points, which include access point 420, access point 440, and access point 450, form a coverage set for RF subdomain A 400. Note that, access point 410 and access point 430 are within the coverage area of access point 420, which due to physical proximity covers both access points with a signal strength level beyond the predetermine threshold value.

Eventually, the coverage set that includes all of the non-redundant nodes is determined for that RF subdomain. The above steps are repeated for all RF subdomains. Therefore, a coverage set will be determined for each RF subdomain.

In one embodiment, as an example of an extreme case, in order to disable the coverage set selection, a network administrator could configure the number of neighbors (or the available number of channels) to be equal to the number of nodes in the RF subdomain.

In another embodiment, as another special case, the network administrator may configure the number of neighbors to be only one. Therefore, the coverage set computation described above will solve the problem of calculating coverage set such that there will be at least one access point covering any point.

Figure 5A:
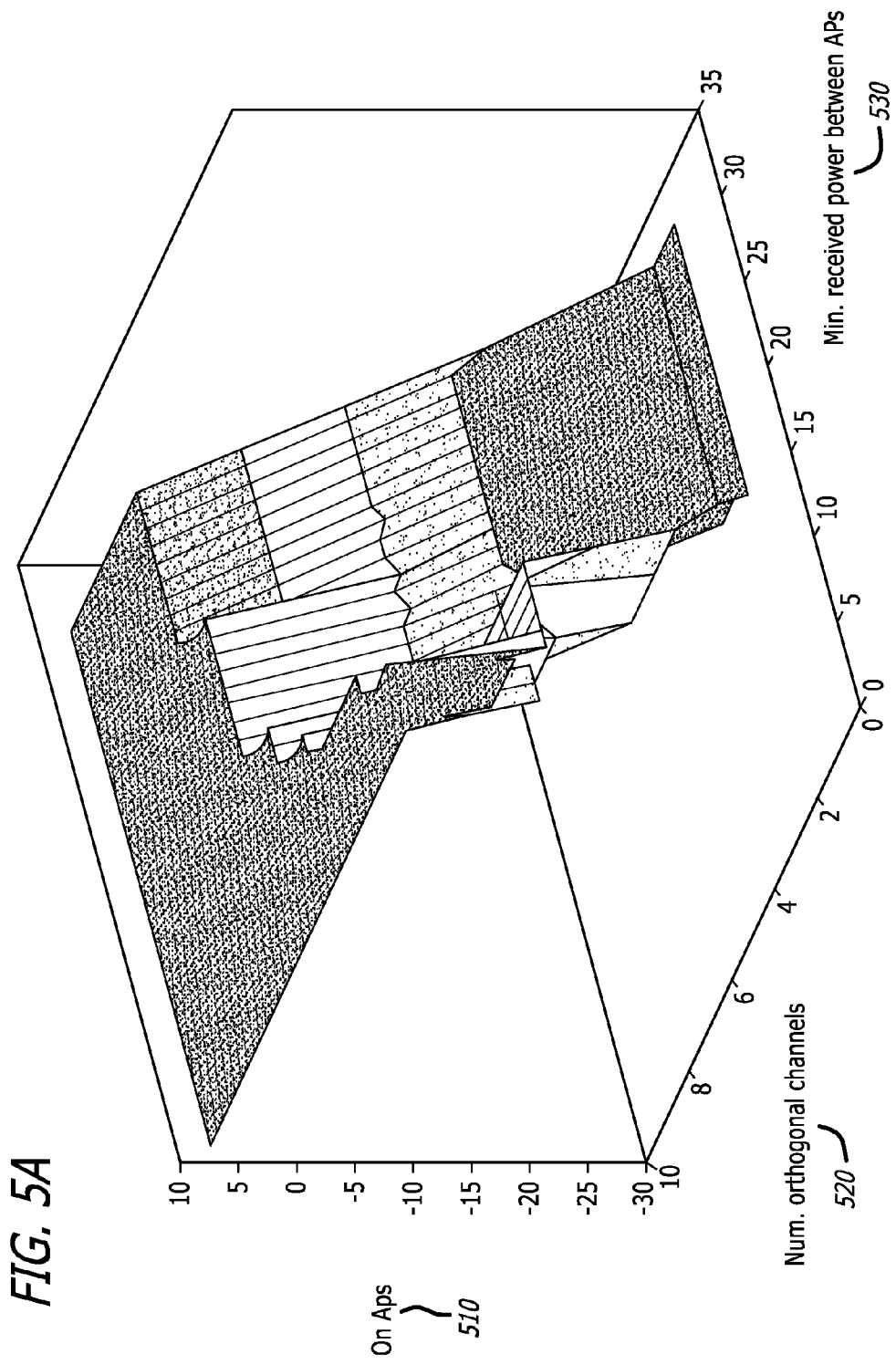
FIGS. 5A-5B show three-dimensional exemplary diagrams illustrating coverage set according to embodiments of the present disclosure.
Figure 5B:
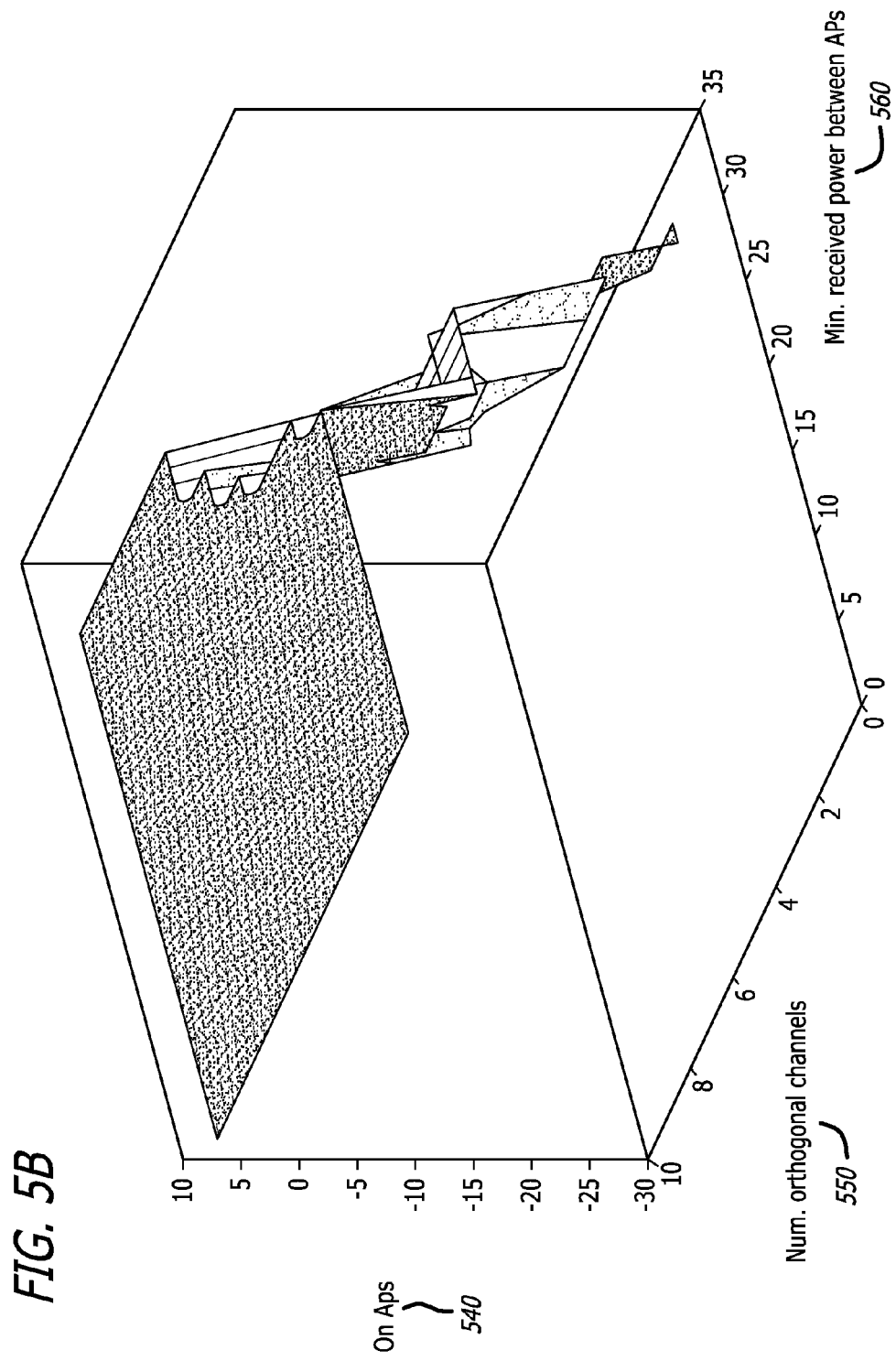

FIG. 5A and FIG. 5B further describe coverage sets with three-dimensional diagrams. Specifically, FIG. 5A illustrates the number of access points that are turned on with maximum transmit power settings according to the technique described in the present disclosure. In FIG. 5A, the x-axis 530 indicates the minimum received power between access points; the y-axis 520 indicates the number of orthogonal channels; and, the z-axis 510 indicates the number of access points that have been turned on.

By contrast, FIG. 5B illustrates the number of access points that are turned on with minimum transmit power settings according to the technique described in the present disclosure. In FIG. 5B, the x-axis 560 indicates the minimum received power between access points; the y-axis 550 indicates the number of orthogonal channels; and, the z-axis 540 indicates the number of access points that have been turned on.

For ease of illustration, in the FIG. 5A and FIG. 5B, the minimum received power between access points (e.g., x-axis unit) is not tagged with actual parameters, but a loop counter whose value ranges from 1-35. A value of 1 may indicate, for example, a minimum received power of −50 dBm between two access point (or any value up to −80 dBm). Hence, in order to have −50 dBm coverage at the neighbors, more access points in the RF subdomain would need to be turned on.

As shown in FIG. 5A, when the transmit power across APs is set to the maximum level, the minimal coverage set computation according to embodiments of the present disclosure results in fewer number of access points remaining ON. At the other extreme, as shown in FIG. 5B, when the minimal coverage set is computed using minimum transmit power, the computation described herein would cause more access points to be turned on.

In this case, since transmit powers are low, the deployment can benefit from channel reuse. However, if the initial transmit powers are too low, the low transmit powers may result in coverage holes. The coverage set computation in the present disclosure can take this into account of such factors. In particular, the RF master device can select a transmit power that will satisfy coverage requirements, and meanwhile ensure that the maximum number of access points can remain to be on within the approved interference limits.

Note that, the resulting coverage set may be specific to each network. For example, the signal strength levels (such as, signal noise ratio or SNR) criteria may vary from one network to another. If a high signal strength level is preferred, the coverage set will likely include more network devices. Likewise, if more frequencies or network capacities are preferred, the coverage set will also include more network devices that will be turned on.

Channel Assignments

Figure 6:
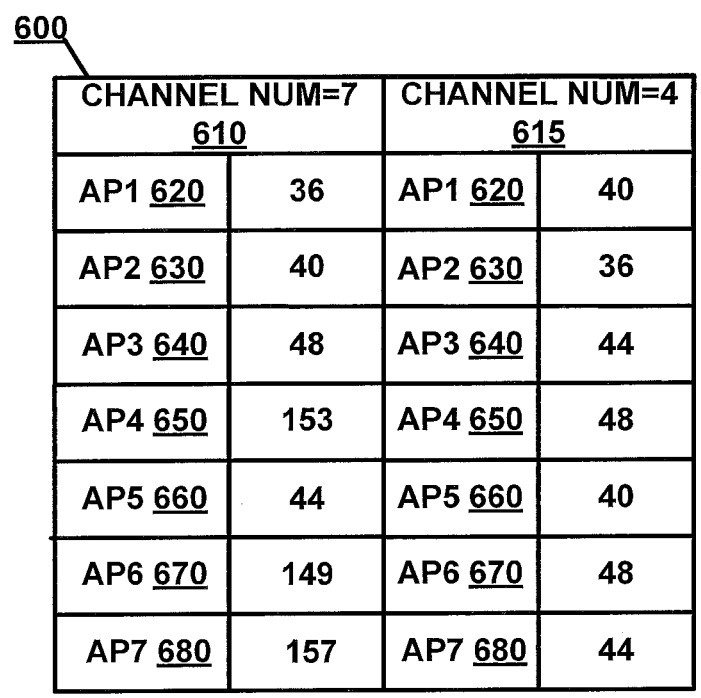
FIG. 6 shows a table illustrating channel assignments according to embodiments of the present disclosure.

FIG. 6 shows a table 600 illustrating channel assignments according to embodiments of the present disclosure. The channel assignment mechanism typically is performed based on a path loss matrix, such as the path loss matrix illustrated in FIG. 5B.

According to embodiments of the present disclosure, the central allocation will anchor channel assignment for each access point in the RF subdomain. Particularly, when the access points initially powers up, the access points will use the anchor channel assigned by the RF master device. In some embodiments, local adjustments can be made by the access point based on temporal properties of the channel, such as response to radar detection, presence of a non-WLAN device on that channel with a high duty cycle, etc. Moreover, the access points can temporarily apply corrective action to move to another channel while monitoring for the expiration of the interfering event, and can return back to the anchor channel selected by the central assignment after the expiration of the event.

In order to calculate the anchor channel assignment, the RF master device selects a RF subdomain, and further selects a random access point from the minimum coverage set. In some embodiments, priority for channel assignment is given to a subset of essential access points. Accordingly, other access points in the RF subdomain will adjust around the channel assignments to the essential access points.

Several approaches can be used to assign channels. For example, according to a heuristic approach, the RF master device performs the following process:

For each access point $AP_i$, where i ∈ {1 ... n}, and where n equals to the number of access points within the computed minimal coverage set for the selected RF subdomain, the RF master device calculates a quality index $best\_quality_i$. The quality index is initialized as INT_MIN.

Next, for each channel Ck ∈ {1 ... m}, where m equals to the number of 20 MHz channels, the RF master device calculates non-valid WLAN network device interference on channel Ck from non-valid network devices. Then, the RF master device calculates valid WLAN network device interference on channel Ck from valid network devices. Also, the RF master device calculates non-WLAN interference. Finally, the RF master device calculates the total quality of channel Ck based on the calculated non-valid WLAN interference, valid WLAN interference, and non-WLAN interference levels.

If the RF master device determines that the total quality is greater than $best\_quality_i$, then the RF master device will assign the access point to channel Ck. The RF master device then repeats this channel assignment process until all access points in the RF subdomain are visited.

As an example, table 600 includes two possible resulting channel assignment schemes. Both channel assignment schemes assume that there is no non-WLAN interference, and that there is no non-valid interference (e.g., WLAN interference source from a different network).

The first channel assignment scheme 610 is based on the assumption that there are a total of 7 available channels (i.e., channel 36, channel 40, channel 44, channel 48, channel 149, channel 153, and channel 157). It is further assumed that the adjacent channel overlap weight is 0%. According to the first channel assignment scheme, AP1 620 is assigned channel 36, AP2 630 is assigned channel 40, AP3 640 is assigned channel 48, AP4 650 is assigned channel 153, AP5 660 is assigned channel 44, AP6 670 is assigned channel 149, and AP7 680 is assigned channel 157.

The second channel assignment scheme 615 is based on the assumption that there are a total of 4 available channels (i.e., channel 36, channel 40, channel 44, and channel 48). It is further assumed that the adjacent channel overlap weight is 50%. According to the first channel assignment scheme, AP1 620 is assigned channel 40, AP2 630 is assigned channel 36, AP3 640 is assigned channel 44, AP4 650 is assigned channel 48, AP5 660 is assigned channel 40, AP6 670 is assigned channel 48, and AP7 680 is assigned channel 44.

Furthermore, according to embodiments of the present disclosure,

Valid interference=co-channel valid interference+
    adjacent channel valid interference =$\Sigma(PL_c+PL_a)$ Non-valid interference=co-channel non-valid interference+adjacent channel non-valid interference=$1/w*\Sigma(PL_c+PL_a)$ where, w=valid to non-valid access point weight; $PL_c$=path loss to a non-valid access point on the same channel; $PL_a$=path loss to a non-valid access point on an adjacent channel such that $PL_c$<X dB, $PL_a$<X dB, and quality a=(1/interference), where X is the predetermined threshold.

Furthermore, in order to characterize a channel assignment, the following metric can be used:

(1) Given the channel assignment mechanism described above, calculate the number of co-channel access points for every channel;

(2) Compute the closest distance between access points for that channel assuming that multiple co-channel access points communicate on the channel; and (3) Use the closest distance across channels as the qualitative metric to characterize the channel assignment.

Note that, this channel assignment mechanism can be repeated over multiple iterations up to a total number of the access points multiplied by the number of channels. Further, the assignment with the maximum co-channel neighbor distance can be used for the topology. Thus, this metric takes into account the co-channel access point cost for every channel, and thereby attempting to maximize the path loss between co-channel access points.

Power Control

Multiple approaches can be adopted to address power allocation problem in accordance with the present disclosure. Specifically, one approach attempts to solve a linear optimization problem. Thus, the RF master device looks for a solution set, such that the interference contributed to each access point by its neighbors is less than the transmit power of that access point by a desired margin (SINR). This condition is to be fulfilled across all access points in the wireless network. Hence, an access point that has more neighbors and is located close to many neighbors will likely have low transmit power, because a high transmit power in such circumstances will likely contribute to more interferences.

Another approach is rather heuristic, and attempts to achieve a goal, e.g., an access point that has more neighbors and is located close to many neighbors should be allowed a low transmit power, without the need to solve any linear optimization problem. This approach simplifies the logic of control-plane mechanism, and avoids the need to deal with non-feasible solutions, if any. This heuristic approach computes the maximum allowable transmit powers at each of the access points in the minimal coverage set based on the maximum allowed co-channel interference (CCI) and the density of that access point deployment. Therefore, if the deployment has many close neighbors near an access point, the transmit power of the access point will be lesser than other access points in the RF subdomain.

A. Linear Optimization Approach

Initial transmit power calculation performed as a part of the minimal coverage set calculation should suffice as a setting for most deployments where the distance between access points are similar. That is, the entries in the path loss matrix as illustrated in FIG. 5B are within 10 dB of the average path loss values.

However, explicit calculation of transmit power and clear channel assessment (CCA) vectors may be essential when the following situations occur:

First, transmit power shall be explicitly calculated when the deployment has a widely varying path loss matrix. In terms of RF distance, this implies that some nodes in the RF subdomain are clustered, while other nodes are spread out within the RF subdomain; or Second, transmit power needs to be explicitly calculated when the number of neighbors or assumed number of available channels provided as an input for minimal coverage set computation is greater than the number of channels that are actually available. This could be accomplished by having more access points turned on, which implies a higher node degree in the path loss graph. Thus, the deployment will be associated with a higher spatial re-use. Accordingly, the transmit powers will need to be explicitly based on channel coloring and RF distances.

In some embodiments, after channel assignments, the power settings and clear channel assessment calculations can be done on a per access point (per-AP) basis. The following parameters will be used for formalization:

The transmit power of an access point within a subdomain is denoted as $T_i$;
Path loss from co-channel $AP_i$ to $AP_j$ is denoted as $PL_{i,j}$;
CCA threshold selected at $AP_i$ is denoted by $CCA_i$ (note that, this value can be ignored from the calculations if desired);
The interference in terms of received power from every non-valid WLAN devices on the same channel is denoted by $R_k$.

For every orthogonal channel, the control-plane mechanism on the RF master device solves a linear program, and minimizes the sum of transmit powers across all access points in the RF subdomain, while ensuring that the following constraint is met:

$$\Sigma_i T_i - ((\Sigma_j T_j PL_{j,i}) + \Sigma_k R_k) - CCA_i)$$

The above constraint ensures that some minimum signal-to-interference ratio (SIR) is made available at every access point. Such a calculation of power setting is especially useful when the RF distance between access points in a RF subdomain are not homogeneous.

B. Heuristic Approach

Under the heuristic approach, the control-plane mechanism determines a node's average RF distance from its neighbors, and uses this information to compute transmit power across all access points. Note that, this heuristic approach does not compute the minimum transmit power vectors. Rather, it computes the maximum allowable transmit powers at each of the access points based on the maximum allowed co-channel interference (CCI)

Specifically, the heuristic approach performs the followings:

(1) For every access point from the n access points in the RF subdomain, the control-plane mechanism determines the average RF distance of the access point from all other access points.

(2) The control-plane mechanism calculates the transmit power of $AP_i$ as the ratio of $CCI/(deg(i)*(-avg\_pathloss_i))$. The $deg(i)$ function will return the number of nodes with a path loss value that is lesser than a threshold $PL_{max}$. This value can be calculated as the minimum RF distance, at which the maximum transmit power from a neighbor cannot be heard above a threshold $SIR_{threshold}$. Thus, $PL_{max} >= (T_{max} - SIR_{threshold})$. For example, if the maximum transmit power is 20 dBm and the $SIR_{threshold}$ is −70 dB, then the minimum distance for the access point to not be accounted for as a neighbor would be 90 dB. To simplify calculations, the $deg(i)$ function can be replaced by $(n-1)$, where n is the number of access points in the RF subdomain.

(3) To enforce a strict limit on the transmit power, instead of using the average path loss values, the control-plane mechanism can use the minimum path loss and scale transmit power with that value.

(4) To ensure a minimum level of coverage, the output transmit powers could also be configured as the element-wise maximum of (a) the minimal coverage set calculations and (b) the transmit powers computed in (2) above.

To account for interference from non-valid access points and to ensure that valid access points are not unduly clobbered by interference from other access points that are not in the RF subdomain, some measures can be taken to limit the effect that an outside interference source can have on the transmit powers of valid access points. For example, the transmit power of $AP_i$ calculated in (2) above may be altered as:

$$(CCI - min(N_{int}(i), L))/(deg(i)*(-avg\_pathloss_i))$$

In this equation, L denotes the maximum amount of outside interference that our algorithm will accept, and $N_{int}(i)$ indicates the average interference seen at the neighbors of AP i, which is calculated as:

$$k=deg(i)$$

$$N_{int}(i) = \Sigma_k R_k / k$$

In this equation, $\Sigma_k R_k$ denotes the total received interference from non-valid access points at all of $AP_i$'s k neighbors.

C. Activation and Frequency Control

The activation of the above-mentioned radio management can be at different time scales as justified by either a coarse grained resource control or a fine grained resource control.

With a coarse grained resource control, the default granularity is to execute the mechanism in the order of hours. The other factor controlling the frequency of the coarse grained activation is the amount of co-channel interference (CCI) experienced by each access point. If the CCI is beyond a pre-determined threshold, and a timer set for coarse grained control has elapsed, the minimal coverage set computation and channel assignment mechanisms will be run on the RF subdomain. Note that, running these two schemes on a coarser time scale ensures that the system is stable. It also ensures that wireless client devices do not get regularly de-authenticated due to shut-down activities of access points, or due to change of allocated channels.

By contrast, with fine grained resource control, the power allocation mechanism is executed on a finer time scale. This mechanism is allowed to be performed more frequently than the channel assignment and minimal coverage set calculation mechanisms, because it will not cause a widespread disruption of service. Like the coarse grained resource control, the power allocation re-calculation is done when the fine time scale timer expires, and the interference seen at the access points exceeds a pre-determined tolerable interference threshold levels.

The timer intervals, tolerable interference thresholds, and the threshold for the maximum number of associated users are configurable and dependent upon the stability desired from the system.

In some embodiments, the power control mechanism uses a path loss matrix with the additional constraint that all access points in the RF subdomain have been assigned a single channel. Specifically, the power control mechanism calculates the minimum transmit powers across all access points as a vector, e.g, (11, 11, 12, 11, 11, 11, 11) dBm. This vector corroborates with observations from the path loss matrix, in which the RF distances do not vary much. In this example, a minimum desired SIR of −50 dB is selected.

It is important to note that using an optimization solver can sometimes result in infeasible solutions. Hence, in some embodiments, a simple heuristic approach is preferred. With the heuristic approach, unlike the optimization problem which solves for the minimum transmit power vector, the power control mechanism computes the maximum allowable transmit power vector that matches the SIR constraints.

Figure 7A:
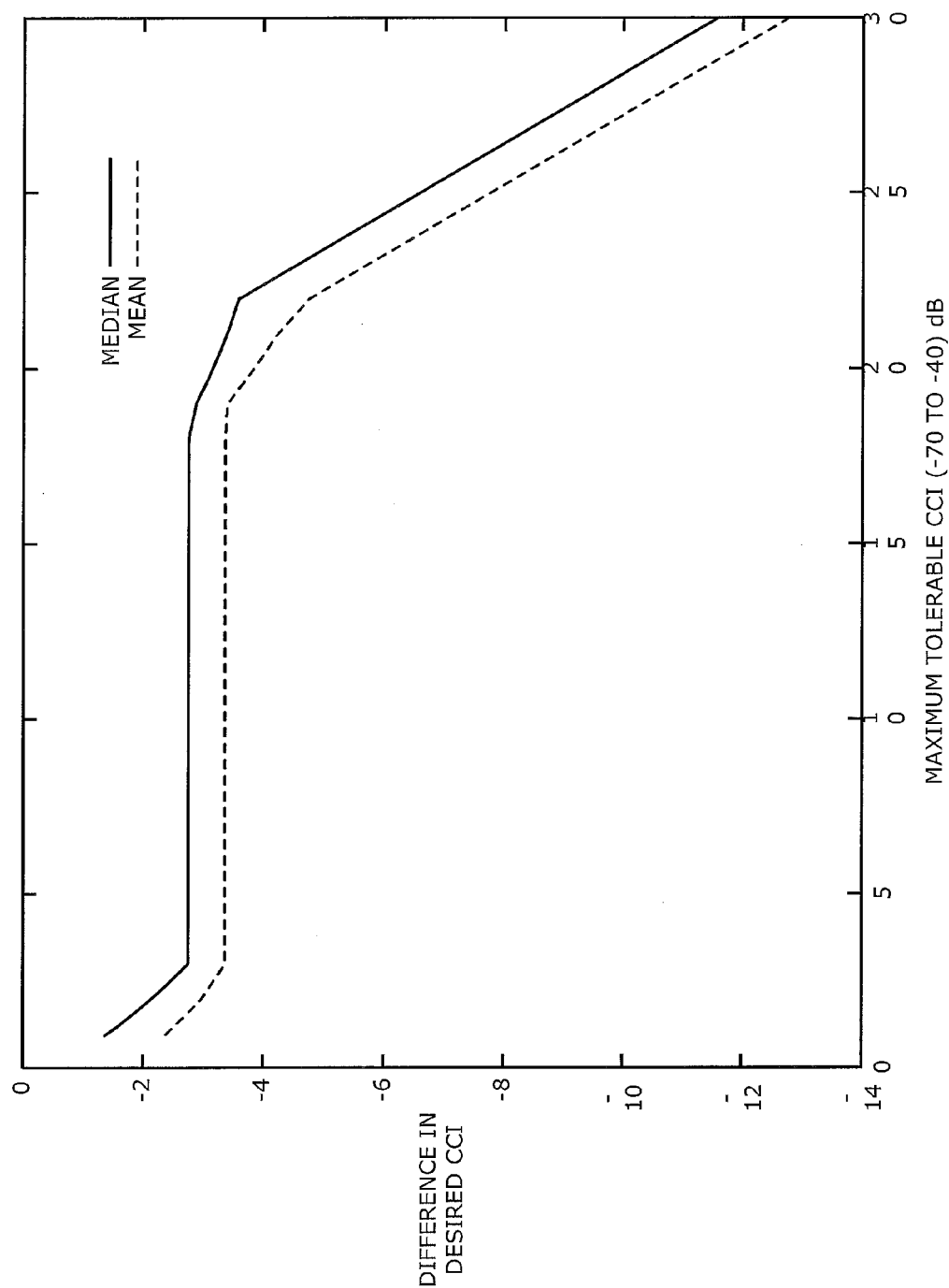
FIG. 7A shows a line chart illustrating wireless network performance with average and median co-channel interference (CCI) according to embodiments of the present disclosure.

FIG. 7A shows a line chart illustrating wireless network performance with average and median co-channel interference (CCI) according to embodiments of the present disclosure. In this example, the maximum tolerable CCI at every access point is varied from −70 to −40 dB as plotted by the x-axis of FIG. 7A. The y-axis of FIG. 7A plots the difference in the desired CCI and the average and median CCI observed across all access points. For most scenarios, the illustrated power control mechanism performs well and the difference between the observed and tolerated CCI is within 4 dB. However, as the maximum tolerable CCI increases towards the right end of the x-axis, the differences between the desired CCI and observed CCI are greater than what can be tolerated. This is because the transmit power is limited at 20 dBm while the tolerated CCI increases, and thus the power control mechanism results in a much lower level of CCI.

Next, considering the impact of external interference on the performance of the transmit power control mechanism according to the present disclosure. In this case, we assume that the sum of external interference at all access points is −65 dBm. However, the power control mechanism can limit the amount of outside interference to be, for example, 3 dB less than the aggregate CCI that the access points in the RF subdomain can tolerate. This is done to ensure that the outside interference does not make valid access point's transmit powers decrease dramatically, which in turn results in deterioration of wireless network performance. Furthermore, in some embodiments, the limit allowed on the amount of outside interference may be adjustable or configurable by a network administrator.

Figure 7B:
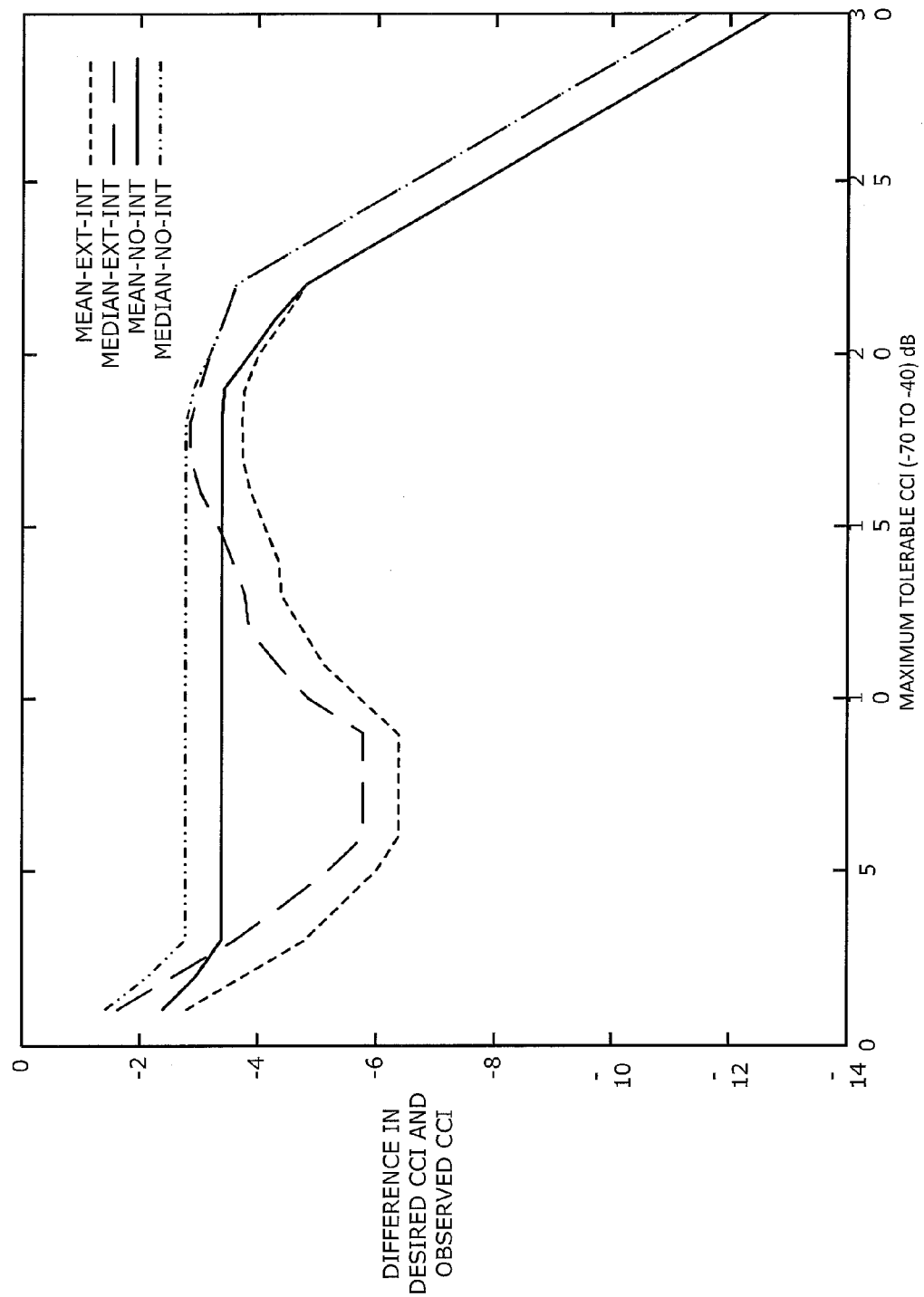
FIG. 7B shows a line chart illustrating wireless network performance with non-valid interference at each network device according to embodiments of the present disclosure.
Figure 7C:
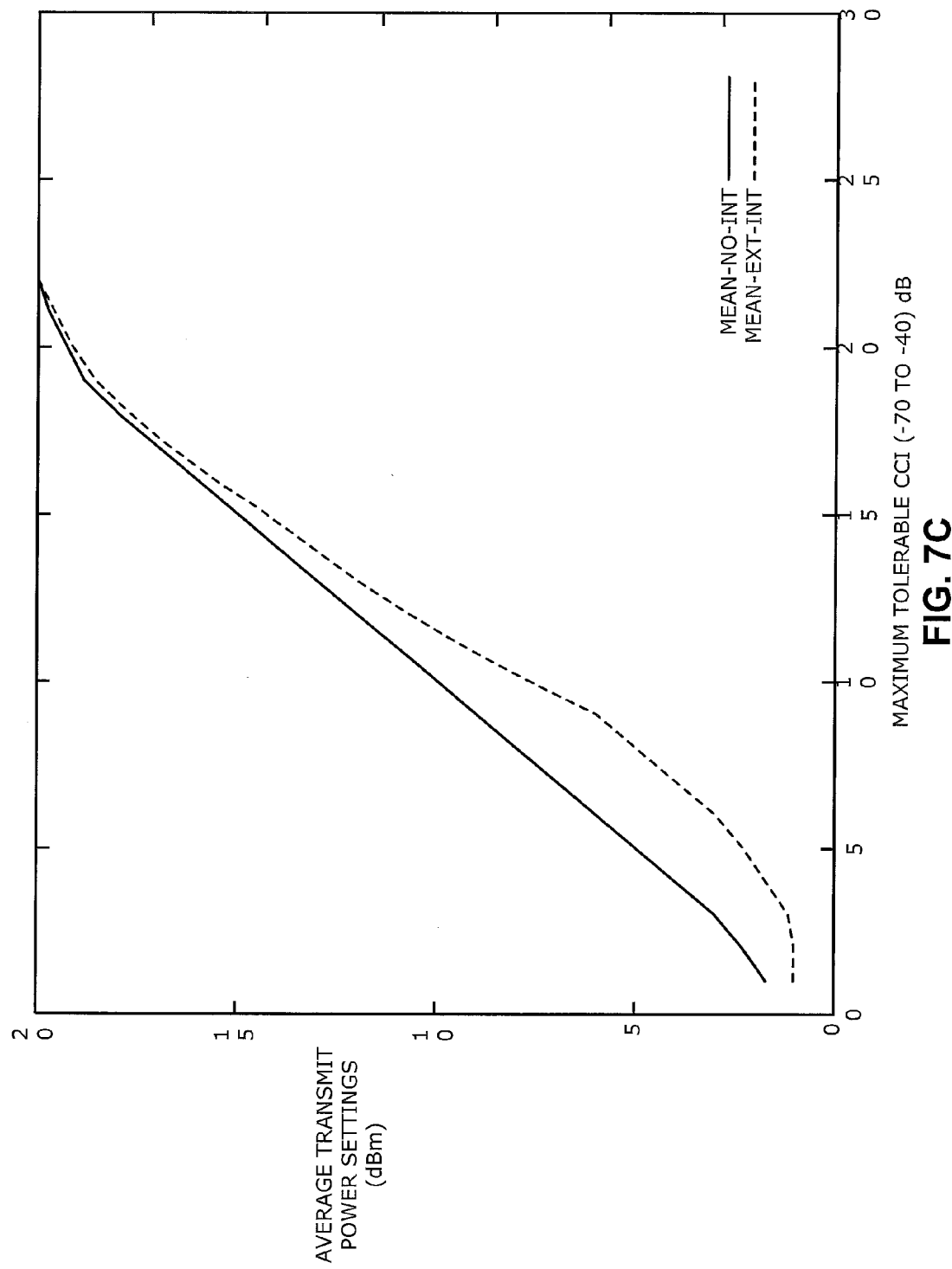
FIG. 7C shows a line chart illustrating average transmit power by network devices according embodiments of the present disclosure.

Simulation results of the above study are as shown in FIG. 7B and FIG. 7C. Specifically, FIG. 7B shows a line chart illustrating wireless network performance with non-valid interference at each network device according to embodiments of the present disclosure. As illustrated in FIG. 7B, even with outside interference, the power control mechanism in accordance with the present disclosure is able to limit the CCI within 6 dB. Note that, for the initial part of the graph, the difference between the desired CCI and observed CCI is high, because the external interference dominates even when the lowest transmit powers are selected. Nevertheless, as the allowable CCI increases, the performance of the power control mechanism described herein improves, and only to be limited by the maximum settable transmit power.

FIG. 7C shows a line chart illustrating average transmit power by network devices according embodiments of the present disclosure. As illustrated in FIG. 7C, the average transmit powers for the case with no outside interference and with −65 dBm interference at each access point increase monotonically with increasing acceptable values of CCI. Also, note that the mean transmit power in the cases with interference grows slowly as compared to the cases with no outside interference. This helps to keep the total CCI at the access points within the desired limits.

Process for Computing Coverage Set and Resource Allocations

Figure 8:
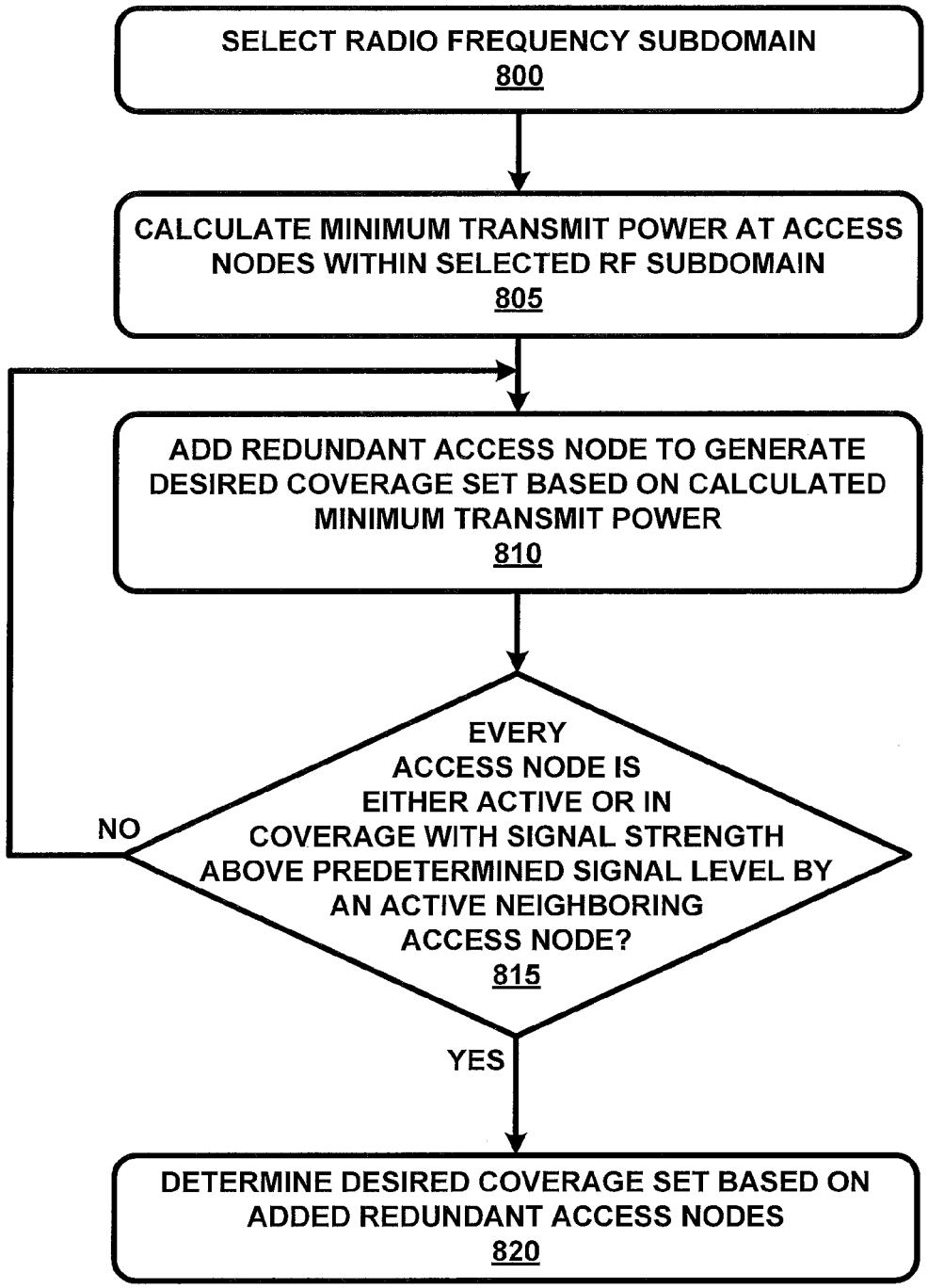
FIG. 8 is a flowchart illustrating calculation of coverage set for wireless networks according to embodiments of the present disclosure.

FIG. 8 shows a flowchart illustrating calculation of coverage set for wireless networks according to embodiments of the present disclosure. During operations, a RF master device first selects a radio frequency subdomain (operation 800). Then, the RF master device calculates a minimum transmit power at access nodes within the selected RF domain (operation 805). Next, the RF master device recursively adds redundant access nodes to generate desired coverage set based on the calculated minimum transmit power (operation 810). In addition, the RF master device checks whether every access node in the selected RF subdomain is either active by itself, or in coverage with a signal strength level above a predetermined signal level threshold by an active neighboring access node (operation 815). If so, the RF master device determines the desired coverage set based on the previously added redundant access nodes (operation 820). Note that, the desired coverage set can be derived by removing all previously added redundant access nodes from the RF subdomain. If not every access node in the selected RF subdomain satisfies the above criteria, the RF master repeats the recursive process and marks additional redundant nodes or active nodes.

Figure 9:
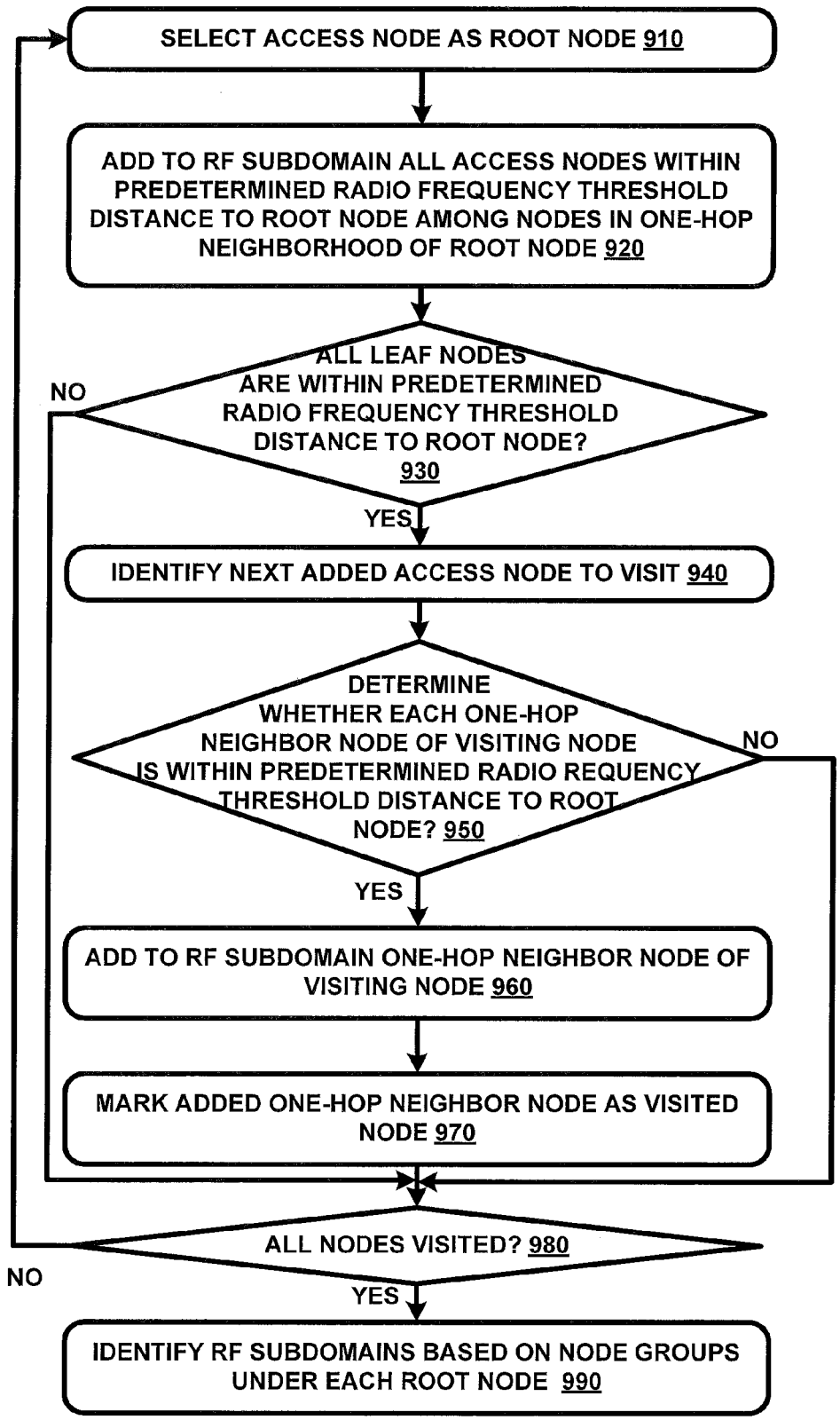
FIG. 9 is a flowchart illustrating radio frequency subdomain partitioning process according to embodiments of the present disclosure.

FIG. 9 is a flowchart illustrating radio frequency subdomain partitioning process according to embodiments of the present disclosure. During operations, the RF master device first selects an access node as a root node (operation 910). Next, the RF master device adds to the RF subdomain all access nodes within a predetermined RF distance to the root node among the nodes in the one-hop neighborhood of the root node (operation 920). The RF master device then determines whether all leaf nodes are within the predetermined RF threshold distance to the root node (operation 930). If so, the RF master device identifies next access node to visit as a visiting node (operation 940). Furthermore, the RF master device determines whether each of the one-hop neighbor nodes of the visiting node is within the predetermined RF threshold distance to the root node (operation 950). If a respective one-hop neighbor node of the visiting node is within the predetermined RF threshold distance to the root node, then the RF master device adds to the RF subdomain the respective one-hop neighbor node of the visiting node (operation 960). Also, the RF master device will mark the added on-hop neighbor node as a visited node (operation 970).

If the RF master device determines that not all leaf nodes are within the predetermined RF threshold distance to the root node, the RF master device further determines whether all nodes are visited (operation 980). If not, the RF master device identifies an access node that has not been visited, selects the identified node as a new root node, and repeats the tree construction process described above during operations 910-970.

Note that, the RF master device recursively checks whether all nodes are marked as visited (operation 980). If the RF master device determines that all nodes have been visited, the RF master device will identify RF subdomains based on node groups under each root node (operation 990). Specifically, all nodes connected to the same root node in the same tree form a single RF subdomain. Thus, the number of root nodes (or the number of constructed trees in the graph) corresponds to the total number of partitioned RF subdomains.

Figure 10:
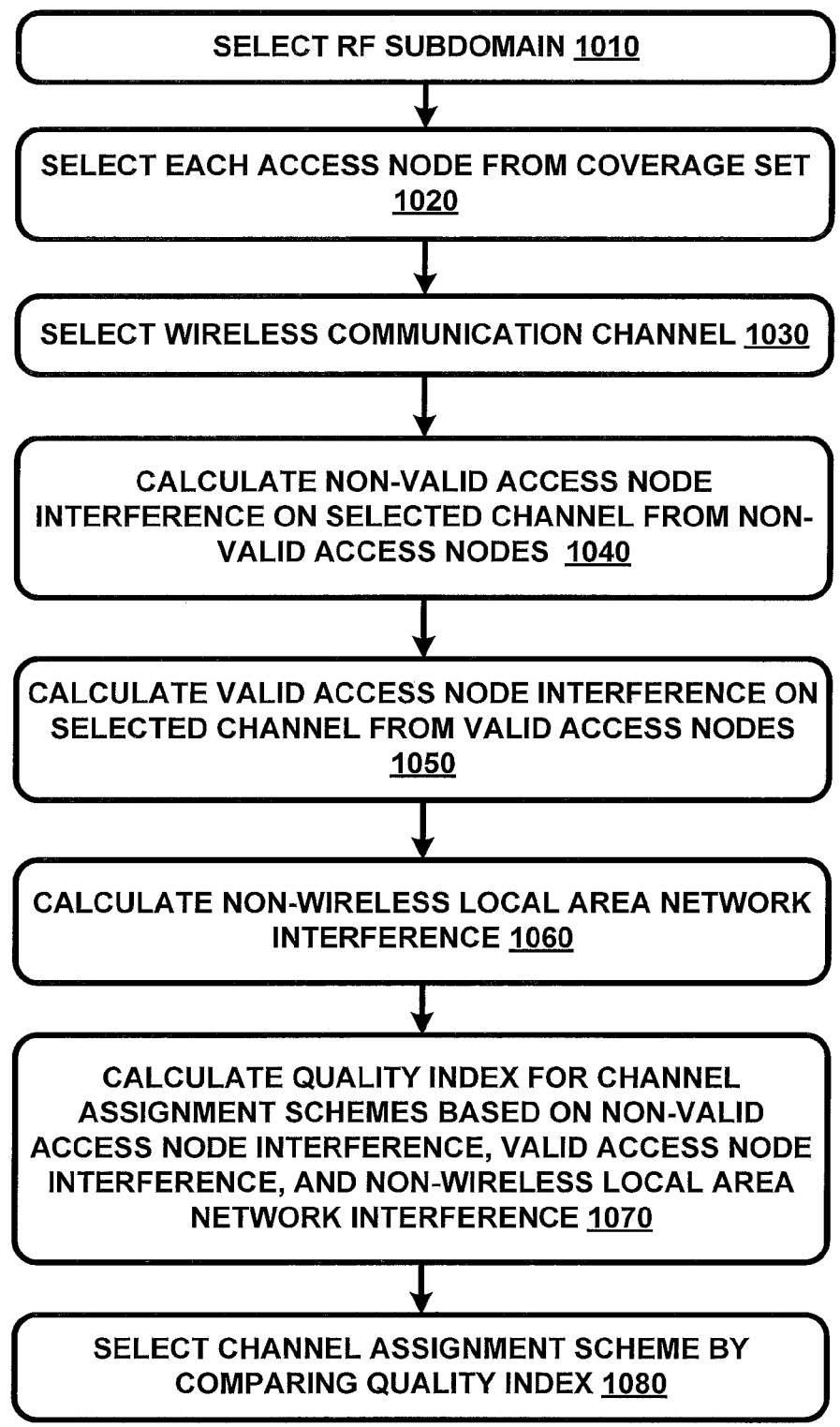
FIG. 10 is a flowchart illustrating channel assignment process according to embodiments of the present disclosure.

FIG. 10 is a flowchart illustrating channel assignment process according to embodiments of the present disclosure. During operations, the RF master device first selects a RF subdomain (operation 1010). Then, the RF master device selects each access node from the desired coverage set (e.g., a minimal coverage set) (operation 1020). Also, the RF master device selects a wireless communication channel (operation 1030). Next, the RF master device performs the following calculations without any specific orders:

The RF master device calculates the level of non-valid access node interference (e.g., interference caused by a network device from a different wireless network) on selected channel from non-valid access nodes (operation 1040);

The RF master device calculates the level of valid access node interference (e.g., interference caused by a network device from within the same wireless network) on selected channel from valid access nodes (operation 1050); and The RF master device calculates the level of non-wireless local area network (WLAN) interference (e.g., interference caused by a non-wireless network device such as a microwave machine) (operation 1060).

Subsequently, the RF master device calculates a quality index for a channel assignment scheme based on the calculated non-valid access node interference, valid access node interference, and non-WLAN interference (operation 1070). The RF master device may calculate different quality index values for various channel assignment schemes using the above factors. Eventually, the RF master device can select from multiple channel assignment schemes a preferred channel assignment scheme by comparing the quality index value associated with each channel assignment scheme (operation 1080).

System for Computing Coverage Set and Resource Allocations

Figure 11:
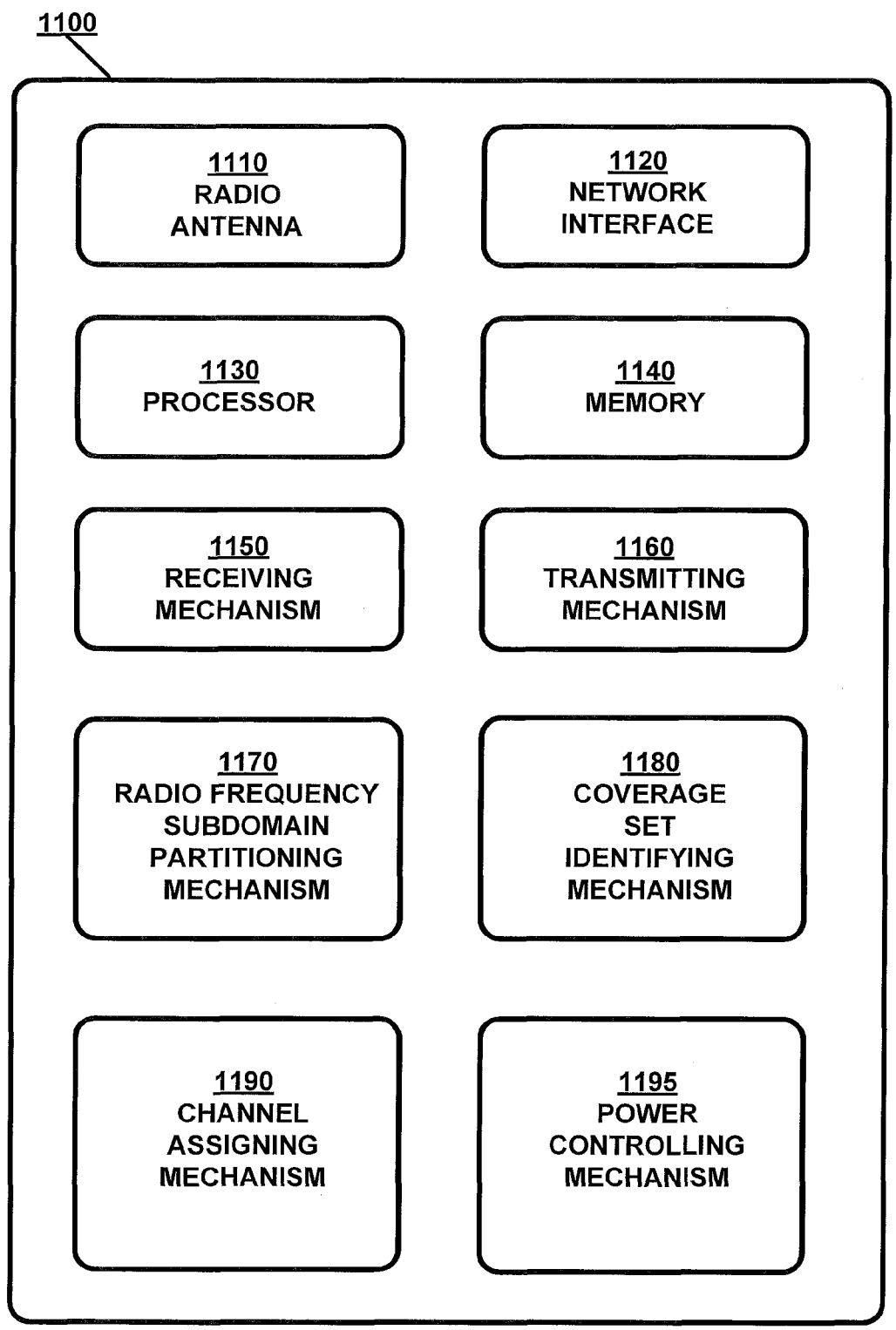
FIG. 11 is a block diagram illustrating a system for computing coverage set and resource allocation in wireless networks according to embodiments of the present disclosure.

FIG. 11 is a block diagram illustrating a system for computing minimal coverage set and resource allocation in wireless networks according to embodiments of the present disclosure.

Operating as a RF master device, network device 1100 includes at least one or more radio antennas 1110 capable of either transmitting or receiving radio signals or both, a network interface 1120 capable of communicating to a wired or wireless network, a processor 1130 capable of processing computing instructions, and a memory 1140 capable of storing instructions and data. Moreover, network device 1100 further includes a receiving mechanism 1150, a transmitting mechanism 1160, a radio frequency subdomain partitioning mechanism 1170, a coverage set identifying mechanism 1180, a channel assigning mechanism 1190, and a power controlling mechanism 1195, all of which are coupled to processor 1130 and memory 1140 in network device 1100. Network device 1100 may be used as a client system, or a server system, or may serve both as a client and a server in a distributed or a cloud computing environment.

Radio antenna 1110 may be any combination of known or conventional electrical components for receipt of signaling, including but not limited to, transistors, capacitors, resistors, multiplexers, wiring, registers, diodes or any other electrical components known or later become known.

Network interface 1120 can be any communication interface, which includes but is not limited to, a modem, token ring interface, Ethernet interface, wireless IEEE 802.11 interface, cellular wireless interface, satellite transmission interface, or any other interface for coupling network devices.

Processor 1130 can include one or more microprocessors and/or network processors. Memory 1140 can include storage components, such as, Dynamic Random Access Memory (DRAM), Static Random Access Memory (SRAM), etc.

Receiving mechanism 1150 receives one or more network messages via network interface 1120 or radio antenna 1110 from a wireless client. The received network messages may include, but are not limited to, requests and/or responses, beacon frames, management frames, control path frames, and so on. Each message may comprise one or more data packets, for example, in the form of IP packets. In some embodiments, receiving mechanism 1150 receives both a radio frequency (RF) subdomain and a coverage set corresponding to the received RF subdomain. Note that, the coverage set include a minimal coverage set that corresponds to a minimum number of radios for providing coverage by the wireless network.

Transmitting mechanism 1160 transmits messages, which include, but are not limited to, requests and/or responses, beacon frames, management frames, control path frames, and so on.

Radio frequency subdomain partitioning mechanism 1170, according to embodiments of the present disclosure, partitions a plurality of access nodes in the wireless network into a plurality of radio frequency subdomains based on a path loss matrix. The path loss matrix includes path loss values between pairs of the access nodes within the coverage set. Each radio frequency subdomain includes access nodes whose radio frequency distances to a selected root node are within a predetermined threshold.

Specifically, radio frequency subdomain partitioning mechanism 1170 selects an access node as a root node, and adds to the RF subdomain all access nodes within a predetermined RF distance to the root node among the nodes in the one-hop neighborhood of the root node.

Next, radio frequency subdomain partitioning mechanism 1170 determines whether all leaf nodes are within the predetermined RF threshold distance to the root node. If so, radio frequency subdomain partitioning mechanism 1170 identifies the next access node to visit as a visiting node, and further determines whether each of the one-hop neighbor nodes of the visiting node is within the predetermined RF threshold distance to the root node. If a respective one-hop neighbor node of the visiting node is within the predetermined RF threshold distance to the root node, then radio frequency subdomain partitioning mechanism 1170 adds to the RF subdomain the respective one-hop neighbor node of the visiting node, and also marks the added on-hop neighbor node as a visited node.

If radio frequency subdomain partitioning mechanism 1170 determines that not all leaf nodes are within the predetermined RF threshold distance to the root node, radio frequency subdomain partitioning mechanism 1170 further determines whether all nodes are visited. If not, radio frequency subdomain partitioning mechanism 1170 identifies an access node that has not been visited, selects the identified node as a new root node, and repeats the tree construction process described above. Note that, radio frequency subdomain partitioning mechanism 1170 recursively checks whether all nodes are marked as visited. If all nodes have been visited, radio frequency subdomain partitioning mechanism 1170 will identify RF subdomains based on node groups under each root node. That is, all nodes connected to the same root node in the same tree form a single RF subdomain. Thus, the number of root nodes or the number of constructed trees in the graph corresponds to the total number of partitioned RF subdomains.

Coverage set identifying mechanism 1180 generally identifies a coverage set for a selected RF subdomain. Specifically, coverage set identifying mechanism 1180 selects a radio frequency subdomain in a wireless network, and determines a coverage set for the selected radio frequency subdomain. The coverage set includes a subset of a plurality of access nodes in the RF subdomain. Moreover, a respective access node in the plurality of access nodes satisfies either (a) the respective access node is a member of the coverage set, or (b) the respective access node is covered by at least one member of the coverage set with a signal strength stronger than the predetermined threshold.

In addition, coverage set identifying mechanism 1180 also calculates a minimum transmit power at the plurality of access nodes in the radio frequency subdomain, identifies a plurality of redundant access nodes in the radio frequency subdomain, and determines the coverage set by excluding the identified redundant access nodes from the plurality of access nodes in the radio frequency subdomain.

In some embodiments, the plurality of redundant access nodes are identified based on one or more of an initial transmit power, an available number of orthogonal channels, a target number of neighbors, and a coverage goal at each access node. In some embodiments, the coverage goal includes a signal strength threshold level in decibels. In some embodiments, an average number of neighbors for each access node in the coverage set is approximate to the available number of orthogonal channels.

In some embodiments, the coverage set is calculated such that at least one access node covers each wireless client device in the wireless network in response to the target number of neighbors being equal to one. In some embodiments, the coverage set includes every access node in the radio frequency subdomain if the target number of neighbors equals to the number of the plurality of access nodes in the radio frequency subdomain.

In some embodiments, coverage set identifying mechanism 1180 also determines whether a respective access node has coverage from at least a predetermined number of neighbors with a signal strength that is stronger than a predetermined signal strength threshold level. In some embodiments, coverage set identifying mechanism 1180 also collects beacon reports that are associated with beacon frames. Further, the beacon reports are received from a plurality of wireless client devices by a plurality of network devices in the wireless network, and determines whether a number of beacon reports that include common access nodes exceeds a threshold.

Channel assigning mechanism 1190 generally assigns channels to access nodes in a minimal coverage set. Specifically, channel assigning mechanism 1190 selects either a capacity mode or a coverage mode as an operating mode of the RF subdomain if a measure of network activity satisfies a predetermined condition, and further performs radio resource management in the radio frequency subdomain based on the selected operating mode.

The measure of network activity will satisfy a predetermined condition, for example, when: (1) a number of client devices in the radio frequency subdomain satisfies a threshold condition; (2) a traffic load in the radio frequency subdomain satisfies a threshold condition; (3) a density of the client devices in the radio frequency subdomain satisfies a threshold condition; (4) a relative location of client devices to network devices in the radio frequency subdomain satisfies a threshold condition; (5) a physical movement of client devices in the radio frequency subdomain satisfies a threshold condition; (6) a time of day being within a preconfigured time range; etc.

In addition, performing the radio resource management may involve performing one of more of: assigning channels to access points in the radio frequency subdomain; assigning transmit power levels to the access points in the radio frequency subdomain; assigning receive sensitivity levels to the access points in the radio frequency subdomain; selecting between power on and power off for the access points in the radio frequency subdomain; etc.

Furthermore, in some embodiments, if the coverage mode is selected as the operating mode of the RF subdomain, selecting between power on and power off for the access points involves selecting power on for the access points that are within the minimal coverage set, and selecting power off for the access points that are in the radio frequency subdomain but outside the minimal coverage set.

In some embodiments, channel assigning mechanism 1190 determines a channel assigning scheme for access nodes within the minimal coverage set.

Also, channel assigning mechanism 1190 calculates a quality index for the channel assigning scheme based on a first level of non-valid access node interference, a second level of valid access node interference, and a third level of non-wireless local area network interference. Moreover, in some embodiments, channel assigning mechanism 1190 calculates the first level of non-valid access node interference on a selected channel from non-valid access nodes. In some embodiments, channel assigning mechanism 1190 calculates the second level of valid access node interference on a selected channel from valid access nodes. In some embodiments, channel assigning mechanism 1190 calculates the third level of non-wireless local area network interference. Furthermore, channel assigning mechanism 1190 assigns channels to the access nodes within the minimal coverage set based on the quality index.

Moreover, in some embodiments, channel assigning mechanism 1190 further can switch the operating mode of the radio frequency subdomain from coverage mode to capacity mode, and re-assign channels to all access points in the radio frequency sub-domain.

Power controlling mechanism 1195 generally assigns transmit power levels and/or sensitivity levels to the access points within a coverage set. For example, power controlling mechanism 1195 can assign transmit power levels to the access points within the minimal coverage set that receive the same channel assignment and assign sensitivity levels to the access points based on the assigned transmit power levels.

Specifically, power controlling mechanism 1195 selects a transmit power associated with a respective access node in the coverage set to obtain a coverage objective. For example, the coverage objective may include a minimum signal strength level and a maximum tolerable interference level.

In some embodiments, power controlling mechanism 1195 receives a path loss matrix, which includes path loss values between pairs of the access nodes within the coverage set. Power controlling mechanism 1195 then determines the transmit power associated with the respective access node using an initial transmit power if the path loss matrix indicates that distances between the pairs of the access nodes are similar. On the other hand, power controlling mechanism 1195 may recalculate the transmit power associated with the respective access node if the path loss matrix indicates that distances between the pairs of the access nodes vary beyond a threshold.

In some embodiments, power controlling mechanism 1195 assigns transmit power levels based on a maximum allowed co-channel interference (CCI) and a deployment density of access points operating on the same channel in the radio frequency subdomain. In some embodiments, power controlling mechanism 1195 determines whether (a) the first access node has more neighbors than the second access node, or (b) the first access node is located closer to neighboring access nodes than the second access node. If either (a) or (b) is true, power controlling mechanism 1195 sets the first access node to have lower transmit power than the second access node in the coverage set.

Therefore, receiving mechanism 1150, transmitting mechanism 1160, radio frequency subdomain partitioning mechanism 1170, coverage set identifying mechanism 1180, channel assigning mechanism 1190, and power controlling mechanism 1195 often collectively operate with each other to compute minimal coverage set and provide resource allocations in wireless networks.

According to embodiments of the present disclosure, network services provided by wireless network device 1100, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. Access points are used interchangeably as access nodes in the present disclosure.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting. The applicants hereby rescind any disclaimer of claim scope in the parent application or the prosecution history thereof and advice the USPTO that the claims in this application may be broader than any claim in the parent application.

What is claimed is:

1. A method comprising:
    determining, by a network device, one or more radio frequency subdomains based, at least in part, on path loss information associated with a plurality of access nodes in a wireless network;
    determining a coverage set for at least a first radio frequency subdomain of the one or more radio frequency subdomains based, at least in part, on path loss information associated with a first subset of access nodes of the plurality of access nodes;
    selecting one of a capacity mode and a coverage mode as an operating mode of the first radio frequency subdomain in response to a measure of network activity satisfying a predetermined condition; and
    performing radio resource management in the first radio frequency subdomain based on the selected operating mode.

2. The method of claim 1, wherein the network activity satisfying the predetermined condition further comprises one or more of:
    a number of client devices in the first radio frequency subdomain satisfying a threshold condition;
    a traffic load in the first radio frequency subdomain satisfying a threshold condition;
    a density of the client devices in the first radio frequency subdomain satisfying a threshold condition;
    a relative location of client devices to access nodes in the first radio frequency subdomain satisfying a threshold condition;
    a physical movement of client devices in the first radio frequency subdomain satisfying a threshold condition; and
    a time of day being within a preconfigured time range.

3. The method of claim 1, wherein performing the radio resource management comprises performing one or more of:
    assigning channels to the first subset of access nodes in the first radio frequency subdomain;
    assigning transmit power levels to the first subset of access nodes in the first radio frequency subdomain; and
    selecting between power on and power off for the first subset of access nodes in the first radio frequency subdomain.

4. The method of claim 3, further comprising:
    selecting, by the network device, a transmit power associated with a respective access node in the coverage set to obtain a coverage objective, which comprises a minimum signal strength level and a maximum tolerable interference level.

5. The method of claim 4, further comprising:
    switching the operating mode of the first radio frequency subdomain from the coverage mode to the capacity mode; and
    recalculating the transmit power level associated with the respective access node.

6. The method of claim 3, further comprising:
    assigning transmit power levels based on a maximum allowed co-channel interference (CCI) and a deployment density of the first subset of access nodes operating on the same channel in the first radio frequency subdomain.

7. The method of claim 6, further comprising:
    assigning sensitivity levels to the first subset of access nodes in the first radio frequency subdomain based on the assigned transmit power levels.

8. The method of claim 1, wherein the coverage set comprises a minimal coverage set that corresponds to a minimum number of access nodes for providing wireless signal coverage within the first radio frequency subdomain, the minimum number of access nodes comprises one or more access nodes from the first subset of access nodes.

9. The method of claim 8, wherein performing the radio resource management comprises selecting between power on and power off for the first subset of access nodes in the first radio frequency subdomain, the selecting between power on and power off for the first subset of access nodes further comprises:
    in response to the coverage mode being selected as the operating mode,
        selecting power on for the one or more access nodes within the minimal coverage set; and
        selecting power off for at least one remaining access node of the first subset of access nodes in the first radio frequency subdomain that is outside the minimal coverage set.

10. The method of claim 8, wherein assigning channels to the first subset of access nodes in the first radio frequency subdomain further comprises:
    determining, by the network device, a channel assigning scheme for the one or more access nodes within the minimal coverage set;
    calculating, by the network device, a quality index for the channel assigning scheme based on a first level of non-valid access node interference, a second level of valid access node interference, and a third level of non-wireless local area network interference; and
    assigning, by the network device, channels to the one or more access nodes within the minimal coverage set based on the quality index.

11. The method of claim 10, further comprises:
    switching the operating mode of the first radio frequency subdomain from the coverage mode to the capacity mode; and
    re-assigning channels to all of the first subset of access nodes in the first radio frequency subdomain.

12. The method of claim 10, wherein calculating the quality index further comprises:
    calculating, by the network device, the first level of non-valid access node interference on a selected channel from non-valid access nodes;
    calculating, by the network device, the second level of valid access node interference on the selected channel from valid access nodes; and
    calculating, by the network device, the third level of non-wireless local area network interference.

13. The method of claim 10, further comprising:
    assigning transmit power levels to access nodes of the one or more access nodes within the minimal coverage set that receive the same channel assignment.

14. A network device comprising:
    a processor;
    a memory;
    a radio frequency subdomain partitioning mechanism that, when executed by the processor, determines a radio frequency subdomain based, at least in part, on path loss information associated with a plurality of access nodes in a wireless network;

a coverage set identifying mechanism that, when executed by the processor, determines a coverage set for the radio frequency subdomain based, at least in part, on path loss information associated with a first subset of access nodes of the plurality of access nodes; and a channel assigning mechanism that, when executed by the processor, the channel assigning mechanism to:

select one of a capacity mode and a coverage mode as an operating mode of the radio frequency subdomain in response to a measure of network activity satisfying a predetermined condition; and perform radio resource management in the radio frequency subdomain based on the selected operating mode.

15. The network device of claim 14, wherein network activity satisfying the predetermined condition further comprises one or more of:
a number of client devices in the radio frequency subdomain satisfying a threshold condition;
a traffic load in the radio frequency subdomain satisfying a threshold condition;
a density of the client devices in the radio frequency subdomain satisfying a threshold condition;
a relative location of client devices to access nodes in the radio frequency subdomain satisfying a threshold condition;
a physical movement of client devices in the radio frequency subdomain satisfying a threshold condition; and
a time of day being within a preconfigured time range.

16. The network device of claim 14, further comprises a power controlling mechanism operating with the processor, the power controlling mechanism to perform one or more of:
assign channels to the first subset of access nodes in the radio frequency subdomain;
assign transmit power levels to the first subset of access nodes in the radio frequency subdomain; and
select between power on and power off for the first subset of access nodes in the radio frequency subdomain.

17. The network device of claim 16, wherein the power controlling mechanism further to:
assign the transmit power levels to access nodes of the one or more access nodes within the minimal coverage set that receive the same channel assignment.

18. The network device of claim 16, wherein the power controlling mechanism further to:
select a transmit power associated with a respective access node in the coverage set to obtain a coverage objective, which comprises a minimum signal strength level and a maximum tolerable interference level.

19. The network device of claim 18, wherein the power controlling mechanism further to assign the transmit power levels based on a maximum allowed co-channel interference (CCI) and a deployment density of the first subset of access nodes operating on the same channel in the radio frequency subdomain.

20. The network device of claim 19, wherein the power controlling mechanism further to assign sensitivity levels to the first subset of access nodes in the radio frequency subdomain based on the assigned transmit power levels.

21. The network device of claim 14, wherein the coverage set comprises a minimal coverage set that corresponds to a minimum number of access nodes for providing wireless signal coverage within the frequency subdomain, the minimum number of access nodes comprises one or more access nodes from the first subset of access nodes.

22. The network device of claim 21 further comprising a power controlling mechanism operating with the processor, in response to the coverage mode being selected as the operating mode, the power controlling mechanism to:
select power on for the one or more access nodes within the minimal coverage set; and
select power off for any remaining access nodes of the first subset of access
nodes in the radio frequency subdomain excluding the one or more access
nodes that is outside the minimal coverage set.

23. The network device of claim 21, wherein while assigning channels to the first subset of access nodes in the radio frequency subdomain, the channel assignment mechanism further to:
determine a channel assigning scheme for the one or more access nodes within the minimal coverage set;
calculate a quality index for the channel assigning scheme based on a first level of non-valid access node interference, a second level of valid access node interference, and a third level of non-wireless local area network interference; and
assign channels to the one or more access nodes within the minimal coverage set based on the quality index.

24. The network device of claim 23, wherein the channel assigning mechanism further to:
switch the operating mode of the radio frequency subdomain from the coverage mode to the capacity mode; and
re-assign channels to all of the first subset of access nodes in the radio frequency subdomain.

25. The network device of claim 23, wherein channel assigning mechanism further to:
calculate the first level of non-valid access node interference on a selected channel from non-valid access nodes;
calculate the second level of valid access node interference on a selected channel from valid access nodes; and
calculate the third level of non-wireless local area network interference.

26. A non-transitory computer-readable storage medium storing embedded instructions that are executed by one or more mechanisms implemented within a network device to perform a plurality of operations comprising:
determining a radio frequency subdomain based, at least in part, on path loss information associated with a plurality of access nodes in a wireless network;
determining a coverage set for the radio frequency subdomain based, at least in part, on path loss information associated with a first subset of access nodes of the plurality of access nodes;
selecting one of a capacity mode and a coverage mode as an operating mode of the radio frequency subdomain in response to a measure of network activity satisfying a predetermined condition; and
performing radio resource management in the radio frequency subdomain based on the selected operating mode.

* * * * *